United States Patent
Haynold

(10) Patent No.: US 10,657,609 B1
(45) Date of Patent: May 19, 2020

(54) SMART SWITCH WITH STOCHASTIC OPTIMIZATION

(71) Applicant: Oliver Markus Haynold, Evanston, IL (US)

(72) Inventor: Oliver Markus Haynold, Evanston, IL (US)

(73) Assignee: Promanthan Brains LLC, Series Cold Futures only, Evanston, IL (US)

( * ) Notice: Subject to any disclaimer, the term of this patent is extended or adjusted under 35 U.S.C. 154(b) by 405 days.

(21) Appl. No.: 14/453,604

(22) Filed: Aug. 6, 2014

Related U.S. Application Data

(60) Provisional application No. 61/863,381, filed on Aug. 7, 2013.

(51) Int. Cl.
*G06Q 50/06* (2012.01)
*F24F 11/30* (2018.01)
*F24F 110/00* (2018.01)
*F24F 140/60* (2018.01)

(52) U.S. Cl.
CPC .............. *G06Q 50/06* (2013.01); *F24F 11/30* (2018.01); *F24F 2110/00* (2018.01); *F24F 2140/60* (2018.01)

(58) Field of Classification Search
CPC .......... H02J 3/14; H02J 2003/143; H02J 3/12; F24F 2140/60; F24F 11/30; F24F 2110/00; G06Q 50/06
See application file for complete search history.

(56) References Cited

U.S. PATENT DOCUMENTS

| | | |
|---|---|---|
| 4,061,185 A | 12/1977 | Faiczak |
| 5,519,622 A | 5/1996 | Chasek |
| 5,598,349 A | 1/1997 | Elliason |
| 5,644,173 A | 7/1997 | Bohrer et al. |
| 5,926,776 A | 7/1999 | Bassett et al. |
| 6,181,985 B1 | 1/2001 | O'Donnell |
| 6,785,592 B1 | 8/2004 | Smith et al. |
| 7,130,719 B2 | 10/2006 | Ehlers |
| 7,171,287 B2 | 1/2007 | Weiss |
| 7,516,106 B2 | 4/2009 | Ehlers |
| 7,778,737 B2 | 8/2010 | Rossi |
| 8,010,812 B2 | 8/2011 | Forbes |
| 8,082,068 B2 | 12/2011 | Rodgers |
| 8,185,245 B2 | 5/2012 | Amundson et al. |
| 8,285,419 B2 | 10/2012 | Drew |
| 8,340,832 B1 | 12/2012 | Nacke et al. |

(Continued)

*Primary Examiner* — William V Gilbert

(57) ABSTRACT

According to some embodiments, a thermostat obtains real-time energy prices from a electricity grid. It may also obtain additional data from external data sources, such as predicted energy prices or weather predictions. The thermostat attempts to find a control strategy for when to switch available aggregates that may include furnaces and air conditioners on and off. In order to solve this integer programming problem, the thermostat uses a random search algorithm. According to some embodiments, various data sources, such as day-ahead prices and real-time prices, are combined into forecasts of electricity prices for the present and future time periods. In some embodiments, a thermostat selects predictively between heating or cooling by letting outside air in or by using heating and cooling aggregates. Additional embodiments are discussed and shown.

22 Claims, 5 Drawing Sheets

(56) References Cited

U.S. PATENT DOCUMENTS

| | | | |
|---|---|---|---|
| 8,359,124 B2 | 1/2013 | Zhou et al. | |
| 8,442,695 B2 | 5/2013 | Imes | |
| 8,478,447 B2 | 7/2013 | Fadell | |
| 8,812,165 B1 * | 8/2014 | Smith | G01R 19/2513 700/28 |
| 9,291,359 B2 * | 3/2016 | Fadell | G05D 23/1902 |
| 2003/0042794 A1 | 3/2003 | Jarrett | |
| 2010/0063832 A1 | 3/2010 | Brown | |
| 2011/0118890 A1 * | 5/2011 | Parsons | H02J 3/14 700/295 |
| 2012/0065796 A1 * | 3/2012 | Brian | G06Q 30/0283 700/295 |
| 2012/0185106 A1 | 7/2012 | Ghosh et al. | |
| 2013/0030576 A1 | 1/2013 | Drew | |
| 2013/0085616 A1 | 4/2013 | Wenzel | |
| 2013/0190940 A1 | 7/2013 | Sloop et al. | |
| 2014/0052305 A1 * | 2/2014 | Kearns | H02J 3/00 700/295 |
| 2014/0156085 A1 * | 6/2014 | Modi | G05D 23/19 700/276 |
| 2018/0049300 A1 * | 2/2018 | Recker | H05B 37/0218 |

* cited by examiner

SMART SWITCH WITH STOCHASTIC OPTIMIZATION

FIELD OF THE INVENTION

This invention relates to the field of optimizing energy cost under real-time pricing.

RELATED APPLICATIONS

This application claims priority from my provisional patent application 61,863,381 for an Energy Price Optimizer, filed on 7 Aug. 2013, which is hereby incorporated in full.

This application is related to my U.S. Pat. No. 14,452,531 for an Energy Cost Optimizer and to my U.S. Pat. No. 14,453,601, also for an Energy Cost Optimizer, both filed on 6 Aug. 2014.

PRIOR ART

The following is a tabulation of some prior art patent documents that appear relevant:

U.S. Patents

| Pat. No. | Kind Code | Issue Date | Patentee |
|---|---|---|---|
| 4,061,185 | A | 1977 Dec. 06 | Faiczak |
| 5,519,622 | A | 1996 May 21 | Chasek |
| 5,598,349 | A | 1997 Jan. 28 | Elliason & Schnell |
| 5,644,173 | A | 1997 Jul. 01 | Bohrer et al. |
| 5,926,776 | A | 1999 Jul. 20 | Bassett et al. |
| 6,181,985 | B1 | 2001 Jan. 30 | O'Donnell & Richards |
| 6,785,592 | B1 | 2004 Aug. 31 | Smith et al. |
| 7,130,719 | B2 | 2006 Oct. 31 | Ehlers & Beaudet |
| 7,171,287 | B2 | 2007 Jan. 30 | Weiss |
| 7,516,106 | B2 | 2009 Apr. 07 | Ehlers & Turner |
| 7,778,737 | B2 | 2010 Aug. 17 | Rossi & Ng |
| 8,010,812 | B2 | 2011 Aug. 30 | Forbes & Webb |
| 8,082,068 | B2 | 2011 Dec. 20 | Rodgers |
| 8,185,245 | B2 | 2012 May 22 | Amundson et al. |
| 8,285,419 | B2 | 2012 Oct. 09 | Drew |
| 8,340,832 | B1 | 2012 Dec. 25 | Nacke et al. |
| 8,359,124 | B2 | 2013 Jan. 22 | Zhou et al. |
| 8,442,695 | B2 | 2013 May 14 | Imes & Hollister |
| 8,478,447 | B2 | 2012 Jul. 02 | Fadell & Matsuoka |

U.S. Patent Application Publications

| Publication Number | Kind Code | Publication Date | Applicant |
|---|---|---|---|
| 2003,004,2794 | A1 | 2003 Mar. 06 | Jarrett |
| 2010,006,3832 | A1 | 2010 Mar. 11 | Brown |
| 2012,018,5106 | A1 | 2012 Jul. 19 | Ghosh et al. |
| 2013,003,0576 | A1 | 2013 Jan. 31 | Drew & Evans |
| 2013,008,5616 | A1 | 2013 Apr. 04 | Wenzel |
| 2013,019,0940 | A1 | 2013 Jul. 25 | Sloop et al. |

Foreign Application Publications

| Publication Number | Kind Code | Publication Date | Applicant |
|---|---|---|---|
| EP 0,999,418 | A2 | 2000 May 10 | Drees |
| EP 2,570,775 | A1 | 2013 Mar. 20 | Shetty et al. |
| WO 2005,071,507 | A1 | 2005 Aug. 04 | Aanonsen et al. |
| WO 2013,019,990 | A1 | 2013 Feb. 07 | Pfeiffer et al. |

BACKGROUND

Consumers are suffering from electricity bills they find excessive, utility companies are suffering from overloaded grids, and the transition toward renewable energy underway in many advanced economies will only make these problems worse since most renewables cannot be scheduled; e.g., wind power is quite cheap when the wind is blowing, but unavailable when the wind is not blowing, and solar power is only available when the sun is shining. Brownouts are a specter that haunts the most advanced countries, and especially high-value-added industries that depend on electricity to process information.

Over the past decade or so, a development emerged that promises to alleviate these problems: the smart grid, and in particular real-time energy pricing. Under real-time energy pricing, electricity customers no longer pay a fixed price per kilowatt hour of energy they consume; rather, this price is allowed to float and to be determined by supply and demand. This brings many advantages: It stabilizes the aging power grid because peak loads get reduced as energy is more expensive at peak time and less expensive off-peak. It is good for consumers who have some flexibility in their energy use because it allows them to shift consumption from times when electricity is expensive to times when it is cheap. Realtime pricing also encourages the adoption of renewable, but unpredictable energy sources such as solar and wind power by providing a mechanism to steer electricity consumption toward times when supply from renewable sources is plentiful. Even with fossil fuels, realtime pricing can help the environment; during peak demand, old, inefficient, and dirty power plants normally held in reserve have to come online to meet the peak demand. By providing an incentive to consume less energy during peak demand times, real-time pricing can reduce the use of these most inefficient plants.

In some places, real-time electricity pricing is now available even for residential customers. Illinois pioneered this development with legislation passed in 2006 that mandates the availability of real-time pricing for residential electricity customers. The problem is that there are not many systems available that allow electricity consumers, and in particular residential and commercial, as opposed to industrial, consumers to adapt their electricity use patterns to real-time prices. The most commonly used solutions are fairly crude: Some electricity providers offer customers an option whereby they can remotely switch off the customer's air conditioning system if the energy price exceeds a certain amount, or they offer to send customers emails or text messages to inform them of high prices so that customers can switch electric loads off.

The most important application where an automatic response to power prices would be desirable is in HVAC systems. In many residential and commercial buildings, air conditioning systems are the single biggest power consumers, and electricity prices typically peak when the weather gets unexpectedly warm and thus more air conditioning units than energy suppliers had expected come online. Therefore, much of our discussion will be about smart thermostats than can regulate air conditioning units in response to changes in electricity prices.

Clearly, it would be desirable to have solutions that can react automatically to changes in energy prices and reduce energy consumption during periods of high prices and allow more energy consumption during periods of low prices. There are numerous systems that attempt to do just that in the patent literature, the most pertinent of which is cited above. With a few exceptions that we will discuss in more detail, they fall into two partially overlapping groups.

Common Approaches

The first group are rather simple contraptions that monitor the prevailing electricity price and switch off electrical consumers in response to increased prices. For example, thermostats may increase the cooling setpoint temperature or even entirely switch off air conditioning if energy prices exceed a certain level.

The second group of solutions in the patent literature are complex, centralized systems where a central system at the utility maintaining the grid communicates with systems at the customer site to switch electrical loads on and off. In the simplest case, this is a one-way communication whereby the utility company can remotely switch off electrical loads at the customer site when demand is high; this can either be a response to real-time pricing, or it can be implemented even in a system without real-time pricing where, for example, the customer simply obtains a fixed rebate for giving the power company the privilege to switch off his air conditioner at times of high demand.

These systems have a number of serious disadvantages that limit their efficiency, effectiveness, adoption, and sophistication, however. They need a separate one-way communications channel from the power company to the customer to communicate commands to potentially many millions of electric loads. If this is done by a central command to all loads at once, the power grid may not exactly get stabilized from all of these loads going on- and offline at exactly the same time; if each device is addressed separately, there is a lot of data traffic to carry, and it is not easy to decide on an equitable system to determine which customer gets shut off when. These systems also don't offer a lot of flexibility since the communication is one-way and thus the customer is not able to communicate special situations: for example, someone may normally be willing to have his air conditioning shut off during peak times, but may very much want the air conditioning on a few occasions when his child is sick or he is hosting an important visitor. If the utility company had more information about each customer's wants and needs, the task of finding the best solution to meet these wants and needs would still be truly daunting. Relying on centralized decisionmaking also introduces a central point of failure. Finally, relying on a centralized structure creates regulatory and psychological hurdles to adoption of new, innovative ideas: The electricity grid is heavily regulated, and adoption of innovations will often require the approval of legislators or regulators, which at the very least tends to be time-consuming. Consumers may also simply not like the idea very much of an operator at some remote control desk switching their air conditioning on and off at his, not their, pleasure.

The more advanced systems in the second group of solutions in the existing literature are more ambitious and use a two-way communication channel between the utility company and the customer site. For example, U.S. Pat. No. 5,926,776 teaches a smart thermostat that receives the current energy price from the utility company. The user can set different temperature setpoints for different energy price brackets, such as low, medium, and high prices. The thermostat then sets these temperature setpoints and and transmits the current temperature and temperature setpoint back to the utility company. This requires a very tight integration between the thermostat and the utility company, which the patent, perhaps a little comically, proposes to put to extra use by also using the thermostat as a terminal to pay the monthly energy bill.

These more advanced centralized systems ameliorate the problem of the decisionmaker, i.e., the utility company, not having information about each customer's wants and needs, but they exacerbate most of the other problems we discussed. Finding the optimal combination of which of millions of electrical devices to switch on and off is a problem that is extremely hard to solve on a centralized server: switching millions of loads on and off is a huge integer optimization problem for which a global optimum is very hard to find. If the communication channel between the utility company and the customer site breaks down, the customer might be stuck without properly functioning heating and air conditioning, even though the power grid itself works perfectly well. The adoption of new ideas is difficult since everything at the customer site is tightly coupled to a huge system with lots of organizational inertia. Consumers may also not be particularly willing to transmit information about each electrical device they are using to a power company.

Advanced Approaches

After having discussed the two most common approaches, we now turn to four more interesting inventions in the patent literature that go beyond the approaches we discussed so far.

The approaches we have seen so far only considered the current energy price and then, in the case of controlling an HVAC system, adjust the setpoints of a thermostat accordingly. U.S. Pat. No. 8,359,124 teaches an energy optimization system that goes beyond this approach and can look into the future. It uses an optimization module that can run either at the customer site or at a centralized server run by the utility company. This makes it possible to adjust thermostat setpoints or other electrical appliance loads not only based upon the current energy price, but also to take into account the tradeoff between using energy now at the current price or using energy later at the price that will prevail then.

In this context, it is interesting to observe that virtually all of the prior art appears to assume that electricity prices, either for the current time period or for future time periods, are and can be known at the time an optimization process is run. As we shall see later, this assumption does not actually hold in most electricity markets.

Like much of prior art, this patent assumes a fairly centralized system with constant data exchange between the utility company and the customer. Specifically, this patent teaches a tight integration between computer systems owned and managed by the utility and computer systems with a central server "configured to exchange customer site information comprising measured information, predicted information and customer input information with each of the customer sites." This approach brings all the disadvantages of centralized systems we have discussed above.

U.S. Pat. No. 8,359,124 also discusses controlling an HVAC system as part of its optimization system. It is worth noting that the optimizer in this patent "uses the the thermal model to calculate the optimum temperature setpoint for all zones in the customer site so as to minimize the cost of heating or cooling required for maintaining the temperatures within a user defined comfort zone." This is to say, the optimizer does not control the operation state of an air conditioning compressor directly but rather does so indirectly by setting wider or narrower temperature limits on a conventional thermostat. The inventors might have chosen this approach either for easy integration with existing heating systems or in order to solve the problem, as their patent teaches, as "a standard optimization problem (e.g., linear programming, quadratic programming, nonlinear programming, etc.)" which requires the variables to be optimized to be continuous. Thermostat setpoints are continuous variables, whereas an air conditioning compressor typically can only be in discrete states such as off or on or perhaps off and one of two different power levels, but not be run at, for example, 30% of power. Solving optimization problems where the variables to be optimized are discrete is known in the art to be a much harder problem than solving problems where the variables are continuous; specifically, solving optimization problems for discrete variables is NP-hard. Although the approach of setting temperature setpoints instead of controlling an air conditioning compressor or a furnace directly simplifies the math and improves backward compatibility, it also reduces cost efficiency because the optimizer cannot control the load directly to place usage in time intervals with the lowest energy costs. In particular, controlling temperature setpoints instead of controlling the discrete states of the air conditioning compressor or other equipment makes it hard or impossible to exploit short-term fluctuations in energy prices. (Of course, one can control an air conditioning compressor or furnace by setting a thermostat's temperature setpoints to very low or high values that are guaranteed to force the device on or off, but at this point the problem degenerates into an integer programming problem and techniques like linear or quadratic programming will not arrive at a satisfactory solution.)

US Patent Application 2013,008,5616 follows a very similar approach to U.S. Pat. No. 8,359,124. The primary difference is that Application 2013,008,5616 instead of using a thermal model of the building in question uses a training day to learn the thermal characteristics of the building. Like U.S. Pat. No. 8,359,124, Application 2013, 008,5616 does not propose direct control of the discrete states of the air conditioning equipment, but instead optimizes a "setpoint trajectory" for one or more thermostats' temperature setpoints using a linear operator.

US Patent Application 2012,018,5106 goes beyond optimizing continuous variables such as temperature setpoints and formulates a problem of power-grid optimization explicitly as an integer programming problem, which "then can be solved using Optimization Subroutine Library OSL, CPLEX®." Unfortunately, the Application does not quite explain how exactly these libraries are to be used, but presumably the idea is to use their mixed-integer programming subroutines which employ branch-and-bound or supernode processing and impose serious restrictions on the permissible models and objective functions. At any rate, the Application proposes this approach for optimizing power generation, not power consumption, and since power plants tend to be much larger facilities and fewer in number than power consumers, resources to make these optimization strategies work may be affordable for companies running power plants, but certainly are not so for consumers wishing to regulate residential appliances such as air conditioners. Even ignoring the cost of the CPLEX library and the hardware to run it on, the solution proposed would appear rather hard to adapt to applications like a residential thermostat that typically uses a microcontroller with severely constrained memory and computational resources, and the Application does not contemplate such a use. The use of method like branch-and-bound or supernode processing implies serious restrictions of thermal and energy models that can be used which may make it difficult to adapt the method to real-world problems, and even with well-chosen models will often have trouble finding an optimal solution.

WIPO Patent Application WO 2013,019,990 proposes using the air conditioning in data centers as spare capacity to stabilize power grids. This Application does not appear to teach a specific method for calculating an optimal cooling strategy, but from FIGS. 3 and 4 of that Application it appears that the idea proposed is to change the temperature setpoint of a thermostat to a fixed lower value while energy prices are low, but prices a few hours out are expected to be high, and then to change the temperature setpoint back to a fixed normal value. The question left open is to find out what one would consider a 'low' or 'high' price.

US Patent Application 2013,019,0940 teaches methods involving the use of weather predictions to optimize energy cost. It does not however, disclose how, specifically, this is to be done. For example, the Application suggests the "the optimizing and scheduling module [ . . . ] adjusts the series of temperature set points to provide additional cooling (i.e., pre-cool) to the home in the earlier part of the morning (e.g., 8:30 am) so that the air conditioner in the home does not need to run as long at 11:00 am when the exterior temperature is hotter. Also, the optimizing and scheduling module 210 understands that the price of energy at 8:30 am is lower than the predicted cost at 11:00 am, so an increased consumption of energy in the early morning achieves a cost savings versus consuming more energy at the later time of 11:00 am." It does not, however, give a method to decide when to precool, how much, or how to arrive at estimates of energy cost, but leaves that question at the rather laconic "[s]everal mathematical algorithms can be used in developing possible predictions of the energy consumed by buildings connected to the system 100, as well as predicting the specific amount of energy devoted to the operation of HVAC," and the reader to wonder whether there are any algorithms particularly suitable to the job.

From this review of the prior art a certain malaise in controlling electric loads, and HVAC systems in particular, with respect to energy prices becomes apparent. The prior art has recognized this to be a problem in need of a solution for quite some time, but the existing proposals suffer from severe problems. Centralized solution methods either are very crude and control different loads with different business needs in the same way, such as by simply shutting them off, or become computationally infeasible. Attempts at more sophisticated control that takes the business needs of each location into account propose methods that will not work very well or not at all, or simply don't suggest any particular method how to solve the problem. All of the prior art that attempts to take future electricity prices into account appears to assume that these future electricity prices are already known when in fact under many modern electricity markets the final electricity price for a time period will only be revealed once the time period is over. Thus, there is a clear and long-felt need for devices and methods that overcome these problems.

SUMMARY

According to some embodiments, a thermostat obtains real-time energy prices from a electricity grid. It may also obtain additional data from external data sources, such as predicted energy prices or weather predictions. The thermostat attempts to find a control strategy for when to switch available aggregates that may include furnaces and air conditioners on and off. In order to solve this integer programming problem, the thermostat uses a random search algorithm. According to some embodiments, various data sources, such as day-ahead prices and real-time prices, are combined into forecasts of electricity prices for the present and future time periods. In some embodiments, a thermostat selects predictively between heating or cooling by letting outside air in or by using heating and cooling aggregates. Additional embodiments are discussed and shown.

Advantages

Some advantages of some embodiments include:
a) The energy cost optimizer is easy to roll out and to adapt to new applications since it may reside entirely at the customer's site and the only required coupling with the electricity grid is obtaining energy and obtaining real-time prices, which have to be available anyhow for any real-time pricing scheme to function.
b) The energy cost optimizer can look into the future and exploit intertemporal energy price arbitrage opportunities.
c) The energy cost optimizer can take advantage of short-term energy price fluctuations by directly controlling an electrical load to come on or off during price excursions.
d) The energy cost optimizer protects customers' privacy since no information other than the power consumption stored by the power meter needs to be transmitted back to the utility company.
e) The energy cost optimizer works synergistically with thermal insulation installed in structures, with the savings obtained from installing both the optimizer and the insulation being larger than the sum of the savings obtained from each individually.
f) The energy cost optimizer reduces pollution by increasing energy use when power from clean and renewable sources is plentiful and reducing energy use during periods when the least efficient and most polluting spare capacity needs to come online.
g) The energy cost optimizer can work with a wide variety of thermal or other load models and cost functions; in particular, it is not restricted to linear or quadratic models.
h) The energy cost optimizer is easy to implement, including on small computational platforms with limited processor and memory resources and for programmers with limited experience in optimization algorithms.
i) The energy cost optimizer predicts the cost of electricity more accurately in real time than would be possible by using estimates calculated ahead of time.
j) Flexibly using thermal exchange with outside air can drastically reduce required air conditioner run time and associated energy cost.

DRAWINGS—REFERENCE NUMERALS

Figure 1:
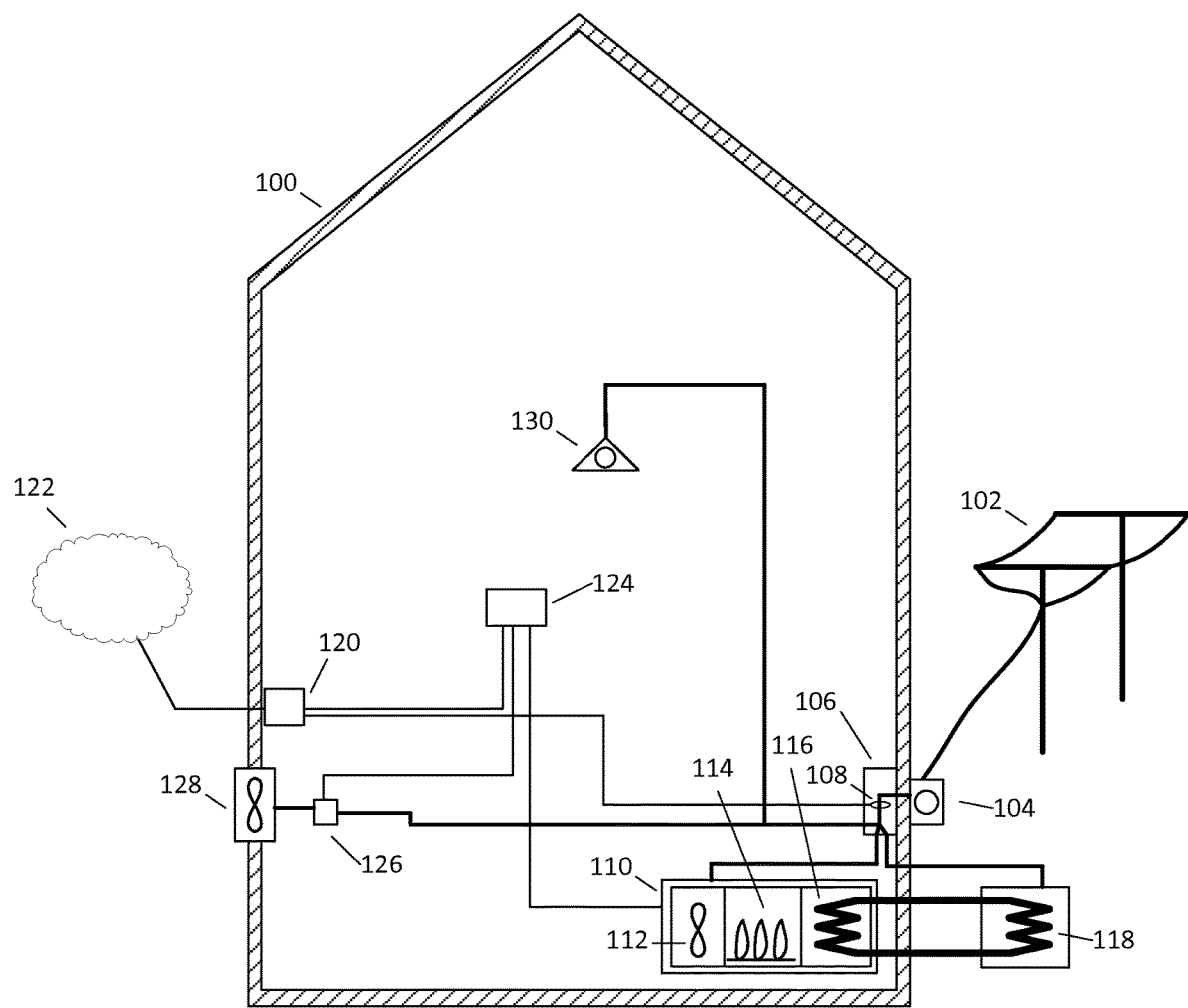
FIG. 1 shows one embodiment of the energy cost optimizer where the optimizer is a thermostat in a single-family home.
Figure 2:
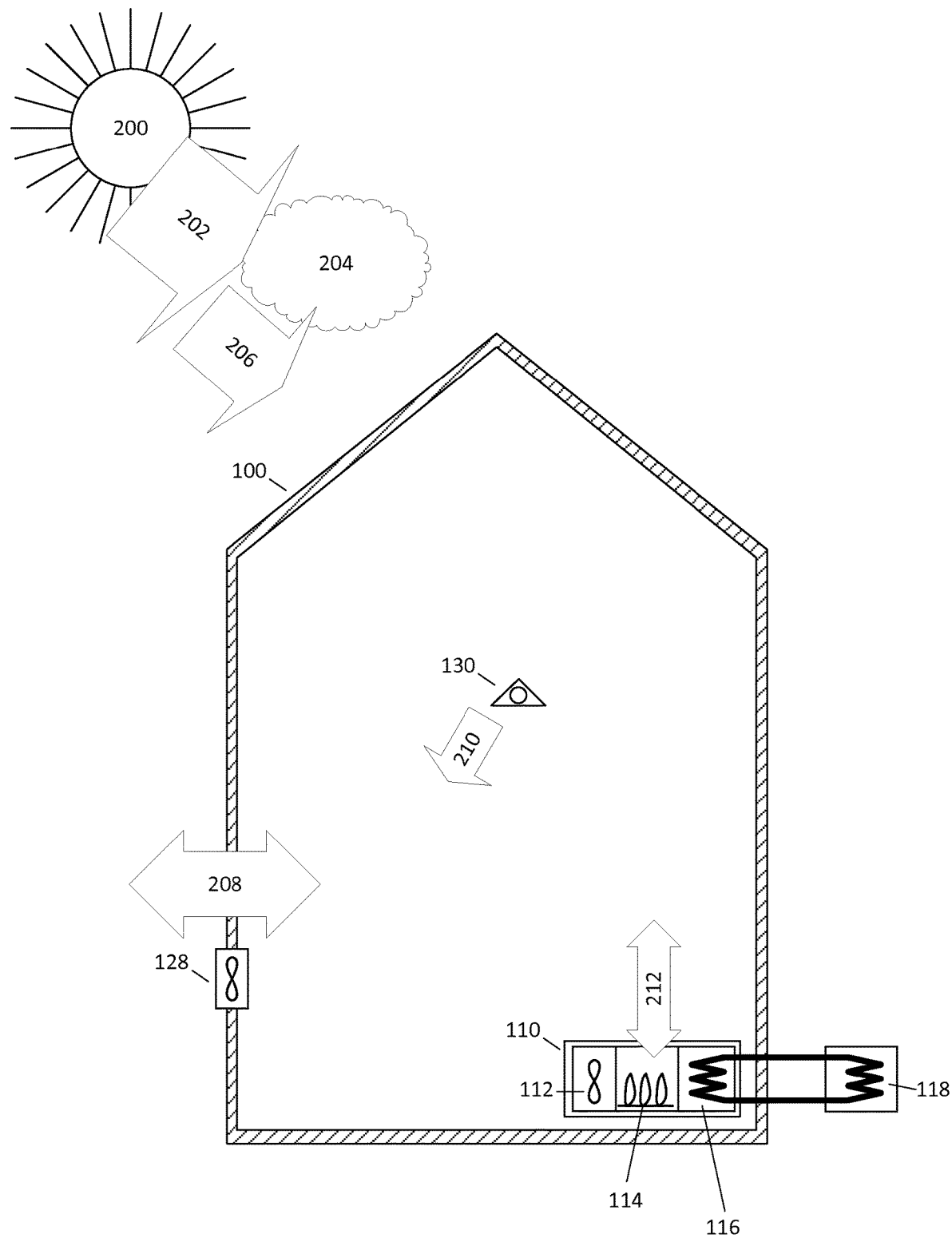
FIG. 2 shows the thermal model used by the energy cost optimizer of FIG. 1.
Figure 5:
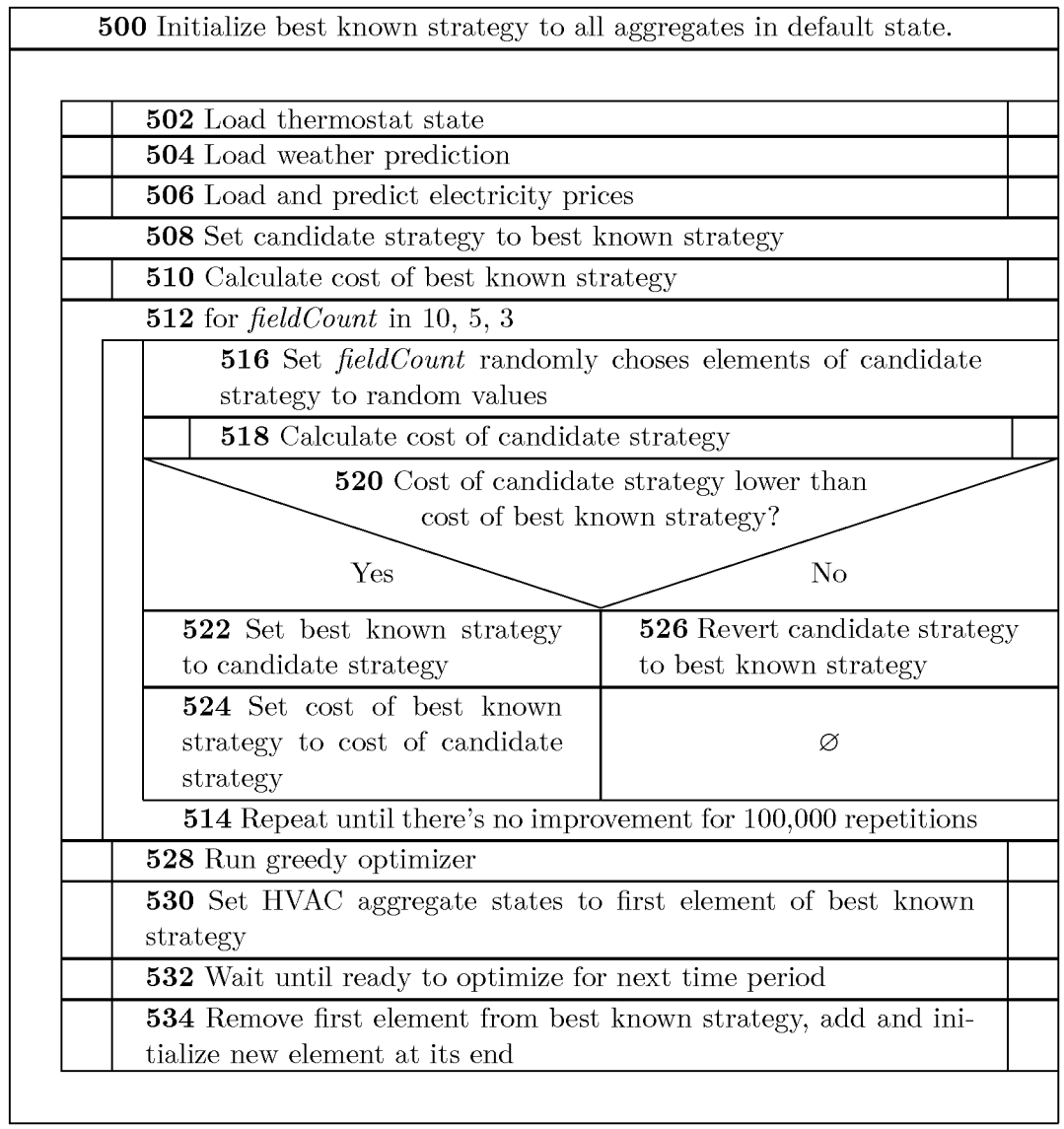
FIG. 5 shows the control flow of the optimizer of the first embodiment.

100 Single-family home/house
102 Public power grid
104 Utility-owned power meter
106 Circuit breaker panel
108 Networked power meter
110 Central HVAC system
112 HVAC system Fan
114 Furnace
116 Air conditioning condenser
118 Air conditioning compressor
120 Network router
122 Internet
124 Energy-price optimizing thermostat
126 Relay
128 Outside air duct/fan
130 Electrical appliance
200 Sun
202 Radiation from sun to earth
204 Cloud cover
206 Solar radiation filtered by cloud cover
208 Heat convection and conduction between house and outside atmosphere
210 Heat emitted from electrical appliances
212 Heat emitted or collected by HVAC system
300 Lower floor
302 Upper floor
304 Upper floor temperature control module
306 Air duct
308 Lower floor damper
310 Upper floor damper
312 Upper floor electrical appliance
400 Refrigerator
402 Goods stored in refrigerator
404 Compressor
406 Condenser
408 Heat flow from outside to air inside refrigerator
410 Heat flow between air in refrigerator and stored goods
412 Heat flow from air in refrigerator into condenser
500-534 labeled on figure DETAILED DESCRIPTION—FIGS. 1, 2 AND 5—FIRST EMBODIMENT According to one embodiment, the invention is implemented as an energy-cost optimizing thermostat in a single-family home equipped with a central HVAC system and an air duct/fan that can move fresh outside air into the house.

Equipment

The system depicted in FIG. 1 is installed in a single-family home 100. The home is connected to a public electrical grid 102 through a power meter 104 and a circuit-breaker panel 106. Inside the circuit breaker panel there is an additional networked power meter 108 installed, which may be the TED 5000 made by Energy Inc. of Charleston, S.C. The home is equipped with a central HVAC system 110, comprising a fan 112, a gas furnace 114, an air conditioning condenser 116, and an air conditioning compressor 118 installed outside the home. If it is possible to read the current power consumption from the utility-owned meter 104 through a computer network, the networked power meter 108 may be omitted and its function taken over by the utility-owned meter.

The public electrical grid 102 offers real-time electricity pricing wherein the power meter 104 records electricity consumption separately for fine-grained time periods, which may be one hour long, and information about the current price is available from the utility or regional transmission organization (RTO) operating the grid through the Internet 122.

The home is equipped with a computer network, which may be an Ethernet network. The central piece of this network is the router 120, through which the network is connected to the Internet 122. The networked power meter 108 is connected to this network through the router 120, as is the energy-price optimizing thermostat 124. The thermostat is also connected to the HVAC system 110 through a 24 V AC signaling cable which may comprise a wire for ground, a wire for power, a wire to activate the air conditioning and a wire to activate the furnace. When either the air conditioning or the furnace are powered up, the fan 112 is also operated by the HVAC system.

The home is further equipped with an air duct and fan 128, which if activated moves fresh air from outside into the home. When the fan is not activated, the air duct is closed by blinds or dampers. The air duct and fan 128 is operated by the relay 126, which in turn is controlled through a 24 V AC signaling cable by the thermostat 124. Appropriate provisions, such as a second duct with dampers, are installed to let air out of the home that is getting replaced by air being moved into the home by fan 128.

The home also contains additional electrical appliances 130, which may comprise electric lighting, kitchen appliances, and so on.

The energy-cost optimizing thermostat 124 controls the operation of the HVAC system 110 and the air duct/fan 128 so as to minimize a cost function that comprises the cost paid for electricity and gas as well as a penalty function for the temperature inside the home. The thermostat 124 is equipped with a microcontroller that includes a processor as well as volatile and non-volatile memory, with a temperature sensor, a network interface, and with output ports that can switch 24 V AC signals. It may be powered through the cable connecting it to the HVAC unit 110. The thermostat may be equipped with a display and some buttons that allow it to be controlled locally, and it may also allow the user to control it in a more sophisticated way, for example by setting a schedule, through a Web interface.

Thermal Model

In order to find an optimal control strategy, the thermostat uses a simplified model of the heat flows into and out of the home shown in FIG. 2. This model need not be perfect; it just needs to be accurate enough to allow for good planning when to run the HVAC aggregates.

The inside of the house 100 is modeled to be at a uniform temperature $\vartheta_{house}$ and the atmosphere outside the house is modeled to be at a temperature $\vartheta_{outside}$.

The sun 200 emits solar radiation 202 to the earth. Some of this radiation is reflected away by clouds 204, leaving a reduced amount of radiation 206 that hits and warms up the home 100. We model this heating effect as $$f_{radiation} = \frac{\partial \vartheta_{house}}{\partial t} = a_{radiation}(1 - c_{cloud})\sin(\max(0, a_{sun})) \quad (1)$$

where t is time, $f_{radiation}$ is the heating of the house by solar radiation, $a_{radiation}$ is a constant, $c_{cloud}$ is the cloud cover observed or predicted by a weather service and may range between 0 for no clouds and 1 for a completely covered sky, and $\alpha_{sun}$ is the elevation of the sun above the horizon.

Heat also gets exchanged between the house and the outside atmosphere, mostly by convection and conduction 208. We model this exchange as $$f_{con} = \frac{\partial \vartheta_{house}}{\partial t} = a_{con}(\vartheta_{outside} - \vartheta_{house}) \quad (2)$$

where $a_{con}$ is a constant that describes how well the house is heat-insulated.

So far, we have described the dynamics of the temperature inside the house if it were a passive structure without either heating or cooling. We now turn to the heating and cooling aggregates present in the house.

The HVAC system 110 can be turned off, operate in heating mode by running the furnace 114, or operate in cooling mode by running the air conditioning compressor 118. We describe its current operating condition by the state variable $s_{HVAC}$ which may take the values Off, Cool, and Heat. The heat introduced into or removed from the house 212 by the HVAC system can then be described as $$f_{HVAC} = \frac{\partial \vartheta_{house}}{\partial t} = \begin{cases} 0 & s_{HVAC} = \text{Off} \\ a_{Cool} & s_{HVAC} = \text{Cool} \\ a_{Heat} & s_{HVAC} = \text{Heat} \end{cases} \quad (3)$$

where $a_{Cool}$ and $a_{Heat}$ are constants that describe the air conditioning and heating systems' effectiveness. This may be conveniently implemented by encoding $s_{HVAC}$ as an integer value that is used as an index into a lookup table. The HVAC system may have additional states such as a second state of cooling and heating, for which additional entries may be added to the lookup table. It is also possible to use a more sophisticated model of the air conditioning that takes into account the difference in the air conditioning's effectiveness as the inside and outside temperature changes, but the simple model given above has proven satisfactory for the application in a single-family home.

The air duct/fan 128 allows us to greatly increase the heat exchange between the inside of the house and the outside atmosphere. There are two possible operating states $s_{OutFan}$, which are Off and On. We model the heat exchange as $$f_{OutFan} = \frac{\partial \vartheta_{house}}{\partial t} = \begin{cases} 0 & s_{OutFan} = \text{Off} \\ a_{OutFan}(\vartheta_{outside} - \vartheta_{house}) & s_{OutFan} = \text{On} \end{cases} \quad (4)$$

Finally, heat is also generated by other electrical appliances within the house. We model this heat 210 as $$f_{Appliance} = \frac{\partial \vartheta_{house}}{\partial t} = \begin{cases} a_{Appliance}(P_{meter} - P_{Cool}) & s_{HVAC} = \text{Cool} \\ a_{Appliance}P_{meter} & \text{otherwise} \end{cases} \quad (5)$$

where $a_{Appliance}$ is a constant describing the thermal capacity of the house, $P_{meter}$ is the electrical power consumption of the house measured by the power meter 108, and $P_{Cool}$ is the electric power consumption of the air conditioning compressor 118, which is installed outside the house and thus does not contribute to heating the house.

By adding up all the heat flows, we can model the total change in the temperature of the house $$f_{House} = \qquad\qquad (6)$$
$$\frac{\partial \vartheta_{house}}{\partial t} = f_{radiation} + f_{con} + f_{HVAC} + f_{OutFan} + f_{Appliance} + f_{Residual}$$

where $f_{Residual}$ represents heat generated by the residents' bodies, cooking, hot water use etc.

We can collect the state variables for all the heating and cooling machines in a state vector $$s = \begin{pmatrix} s_{HVAC} \\ s_{OutFan} \end{pmatrix} \quad (7)$$

Now we can discretize the time t into intervals Δt that may be five minutes long. Then, if we have predictions for the variables $\vartheta_{outside}$, $c_{cloud}$, and $\alpha_{sun}$, values for the constants, and a proposed control strategy s(t) that describes at which times we plan to switch the heat, air conditioning, and fan on or off, and the current temperature of the house $\vartheta_{house}(t_{now})$ we can calculate the predicted temperature of the house $\vartheta_{house}(t)$ in the future by applying the model given above and solving by one of the Runge-Kutta methods; the Euler method is usually sufficiently precise.

Cost Model

Running heating and cooling appliances comes at a cost. Not running them may also come at a cost, albeit one of discomfort, not money. In order to find an optimal tradeoff, we express the discomfort of suboptimal temperatures as a penalty function expressed in units of money so that we can treat it as if it were a financial cost and turn our problem into one of minimizing total cost. The total cost function p for a time interval Δt is then $$p = (P_{electric}\pi_{electric} + P_{gas}\pi_{gas} + p_{convenience} + p_{switch})\Delta t \quad (8)$$

where $P_{electric}$ is the electrical power consumption of the various heating and cooling aggregates, $\pi_{electric}$ is the current price of electricity, $P_{gas}$ is the current gas consumption of the furnace 114, $\pi_{gas}$ is the current price of gas, $p_{convenience}$ is a penalty for the temperature inside the house not being what the occupants would like it to be, and $p_{switch}$ is a penalty for switching a heating or cooling device on and off too often.

$P_{electric}$ and $P_{gas}$ are functions of the control state s, which we can determine from a lookup table containing the electricity and gas consumption of each machine in each state. For example, the HVAC system consumes a certain amount of gas and a certain amount of electricity for the fan when it is in Heat mode, a certain amount of electricity but no gas when it is in Cool mode, and neither gas not electricity when it is turned off.

The convenience function $p_{convenience}$ can be described in terms of an arbitrary function of inside temperature, time, and whatever other model variables may be useful. For example, the convenience function can take the form $$p_{convenience} = a_{penalty}\max(0, |\vartheta_{house} - \vartheta_{desired}| - a_{Width})^2 \quad (9)$$

where $\vartheta_{desired}$ is the desired temperature, $a_{Width}$ is the width of a temperature window within which we are indifferent to changes in the temperature, and $a_{Penalty}$ is a constant that describes how much money we are willing to spend to keep the temperature within its desired window. By setting this penalty to different values, one can determine the tradeoff between having the temperature kept at the most comfortable level versus saving money on power. The constants in the penalty function may vary over time. For example, they may be set by a schedule or they may be changed by a home automation system's knowledge of the house's being or not being occupied at the moment, such as from the state of light switches or motion sensors.

Users may not want to set the parameters of the comfort function manually. The thermostat may allow them simply to select modes with names such as Comfort, Normal, and Eco, where Comfort selects a smaller value for $a_{Width}$ and a larger value for $a_{Penalty}$ and Eco does the opposite.

With many heating and cooling devices, it is not a good idea to switch them on and off rapidly. If this were possible, one could seamlessly regulate the load of these devices by switching them on and off many times per second, as is indeed possible with, for instance, lightbulbs. In order to discourage the optimizer from switching a load on and off too aggressively, we introduce a switching penalty $p_{switch}$ for each state of a heating or cooling device. This penalty is charged each time a device is switched into a new state. So for the HVAC system, there are penalties for switching the system from another state into the Heat or Cool state, and for the fan 128 there is a penalty for switching it into the On state. The penalties for switching into the Off state may be zero.

Having described the thermal model and the cost model, the task of the thermostat 124 becomes clear: it must find a control function s(t) that minimizes the total cost Σp(t) over a range of time intervals ranging from the present to some point sufficiently far in the future.

Data Acquisition and Prediction

In order to predict the future evolution of the house's inside temperature and thus the future value of the penalty function, we need predictions of the weather, energy cost, and power in the future. These can be obtained from any suitable source, typically over the thermostat's connection to the Internet.

Energy Price

In an idealized real-time pricing electricity market, there would be a price that is allowed to fluctuate over short time intervals. Consumers could observe this price and immediately adjust their electricity consumption accordingly. Actual real-time pricing systems are considerable more complicated than that. In this embodiment we use as an example the pricing mechanism of the PJM Regional Transmission Organization (RTO), which is actually available to residential customers through the Residential Real-Time Pricing Program offered by ComEd in Illinois.

On PJM's market, electricity is billed in hourly intervals. The electric meter records the power consumed during each hour, and for each hour there is an electricity price that applies to all power consumed during this hour. This hourly price, however, is only revealed after the hour is over. We can thus not directly use the price we will pay for electricity for our planning. In order to assist in planning, the RTO publishes two more time series of prices. On the afternoon of each day, an auction is held for electricity to be delivered during each hour of the following day. This is called the day-ahead market (DAM). The DAM prices, once published, do not get updated as new information becomes available, for example that a summer day will be warmer than expected and thus power prices will likely be higher than predicted. The RTO also publishes locational marginal prices (LMP) for each five-minute interval shortly after the end of that five-minute interval, although this data feed quite frequently does not work or gets delayed due to technical difficulties. These five-minute LMPs are not used directly for calculating the price the customer will pay, but the average of the five-minute price intervals for the twelve intervals that make up an hour is good predictor of the hourly price. More strictly speaking the price that the customer will pay for an hour, called the settlement price (SPP), will be an average of the twelve LMPs for that hour weighted by the load in a given pricing zone (but not the customer's load specifically) during the time intervals for these LMPs.

The thermostat combines the DAM prices that become known on the previous afternoon with the five-minute LMPs to generate a time series of predicted settlement prices. The model assumes that the DAM prices supplied by the RTO $\pi_{DAM}$ are good predictions as of the time they are published. As time passes, more information becomes known and the five-minute prices $\pi_{LMP}$ get published. The thermostat now uses an AR(1) autoregressive model that assumes that the difference between the predicted and the instantaneous price will decay over time:

$$(\pi_{LMP}-\pi_{DAM})_{t+1}=\rho(\pi_{LMP}-\pi_{DAM})_t+\epsilon \quad (10)$$

where t denotes five-minute time intervals, ϵ represents innovations, and the decay constant β is a number between 0 and 1. Thus if $t_0$ is the last time interval for which we have a five-minute price, then we can compute a prediction for following five-minute indicative prices from:

$$\pi^*(t)=\pi_{DAM}(t)+\beta^{(t-t_0)}(\pi_{LMP}(t_0)-\pi_{DAM}(t_0)) \quad (11)$$

where the day-ahead price $\pi_{DAM}$ (t) for that five-minute interval is obtained by linear interpolation from the hourly DAM prices published by the RTO. By averaging the twelve predicted five-minute prices π* (t) for each hour, we obtain a predicted settlement price $\pi_{SPP}^*$ (t) for power consumed during that hour.

The decay factor β can be found by fitting an autoregressive model to the history of predicted and five-minute prices and currently comes out to about 0.9 in PJM's COMED load zone. Since the dynamics of the energy market may change over time, it is useful to have this factor not fixed but to update it as new information becomes available. The thermostat accomplishes this as each new five-minute price observation comes in by use of a Kálmán filter or simply by computing an exponential moving average with a long decay of the βs realized during previous time periods.

The DAM prices from the RTO are only available for the present day and from the afternoon on for the following day. In order to plan further ahead, the thermostat may take the DAM price for a day for which auction results have not yet been published to be the same as the DAM price for the same time of day from the last day for which DAM prices have been published. More sophisticated estimation methods are possible, taking into account, for example, predicted grid load published by the RTO. Grid load predictions get published further out into the future than DAM auction results, and the algorithm may be adapted to combine the last known DAM results with load predictions to calculate forecast prices further out into the future. The simple method of repeating DAM prices, however, will often be sufficient for applications like a thermostat since the accuracy of price predictions more than 30 hours into the future is not particularly important for the optimization result.

This method may be adapted by those skilled in the art for other electricity markets where some details deviate from what has been shown for PJM, but the basic methods used will often be similar. For example, the ERCOT market also has hourly DAM prices and five-minute LMPs, but the settlement interval is fifteen minutes instead of one hour so that three, not twelve, LMPs get combined into one SPP. ERCOT also publishes results from its SCED algorithm predicting LMPs one hour into the future. Thus a thermostat in the ERCOT market may take the predicted LMPs from ERCOT as the expected LMPs for the next hour and only predict LMPs more than one hour into the future by the AR(1) method shown. These LMPs, whether predicted by the RTO or by the autoregressive model, then still get combined into predicted settlement prices as discussed.

CP Charges

In some markets, including PJM, there are also time-dependent charges not billed directly as a realtime price. Most important in this respect are coincident peak (CP) charges. CP charges are used in various markets to pay for the use of the wires or to pay owners of power plants for providing generation capacity (as opposed to actual generation output). Let us use PJM again as an example. PJM charges what is called a 5 CP charge. These are calculated by taking for each day of the year the hour with the highest load on the PJM grid. Then the five hours from that list with the highest grid load will be the 5 CP hours. That is to say, the 5 CP hours are the five hours with the largest grid load, except that no two CP hours may be for the same day. Then for each customer that customer's electric load during the 5 CP hours is taken and averaged, and that customer has to pay a charge per kilowatt of 5 CP load during each month of the following year. These CP charges can be a substantial part of the overall electric bill, and there can be great economic value in avoiding paying CP charges by not using electricity during CP hours. The difficulty is that the CP hours will be known for sure only at the end of the year, so we will have to estimate the likelihood of a given hour being a CP hour.

This can be accomplished in a manner similar to the way in which we estimated settlement prices. First, we have to estimate the grid load during a given hour. PJM, as well as other RTOs, publishes predictions of grid load $\Lambda_{pred}(t)$ for each hour well in advance as well as realized grid load $\Lambda_{real}(t)$ for each five-minute interval shortly after that interval is over. Thus we may use an AR(1) model of the same form as we used for present and future LMPs to estimate present and future grid load:

$$\Lambda^*(t)=\Lambda_{pred}(t)+\beta^{t-t_0}(\Lambda_{real}(t_0)-\Lambda_{pred}(t_0)) \quad (12)$$

with $\Lambda_{pre}d(t)$ for each five-minute interval calculated by linear interpolation from the published hourly predictions and the reversion factor $\beta_\Lambda$ fitted from past data. Then the load for twelve of these five-minute intervals gets averaged into expected hourly average loads $\Lambda^{\#}(t)$. As actually realized loads get published, these replace $\Lambda^*$ (t) for their respective time intervals.

We can now estimate an expected CP surcharge for each hour for which we have a load-prediction by a two step-process of first estimating a measure of the chance that a given day will be a CP day and then estimating the chance that a given hour within that day will be a CP hour.

We estimate the risk for each day by a formula $$p^*(d) = \min\left(\max\left(\frac{\left(\max_{date(t)=d}\Lambda\#(t)\right)-\Lambda_a}{\Lambda_b - \Lambda_a}, 1\right), 0\right) \quad (13)$$

where $\Lambda_a$ is a grid load at which we're certain that there will be no CP charge and $\Lambda_b$ is a grid load at which we're certain that there will be a CP charge. Then for each hour of the day we can estimate the risk of the hour being a CP hour from $$p(t) = p^*(date(t))\left(\frac{\max\left(\frac{\Lambda\#(t)}{\max_{date(u)=date(t)}\Lambda\#(u)}-\delta, 0\right)}{1-\delta}\right)^4 \quad (14)$$

where δ may be fitted from past data and could come out as about 0.95. That is to say, we're assuming a high risk for the hour in the day with the highest load, lower risks for hours with loads that are still close to the hour with the highest predicted load, and no risk for hours whose predicted load is substantially below the predicted load for the highest-risk hour. The exponents in these two equations may also be modified and fit to past data. We then calculate a risk adder for each hour's settlement price as $$\pi_{CP}(t)=\Pi_{CP}p(t) \quad (15)$$

where $\Pi_{CP}$ is cost that one has to pay for a kilowatt hour consumed during a CP hour. The method as given here intentionally overestimates CP risk somewhat to reflect a risk preference of strongly wanting to avoid CP charges and the values of $\Lambda_a$ and $\Lambda_b$ being uncertain since we cannot accurately predict the weather and consequently grid load months ahead. The adder $\pi_{CP}(t)$ then gets added to the estimated settlement price for that hour, so that the price we're using in the optimizer is the sum of the estimated CP charge risk and the estimated settlement price.

This method for estimating CP charges may be suitably modified for other electricity markets. For example in ERCOT there are 4 CP charges which are paid only by some customers, and the 4 CP intervals are calculated so that there is one CP interval for each of the four summer peak months.

We can then calculate an overall electricity price for each hour (or other settlement interval as the case may be) as the sum of the expected settlement price, the expected capacity charge, and a fixed cost $\pi_{delivery}$ for delivery, taxes, etc.

$$\pi_{electric}(t) = \pi_{SPP}^*(t) + \pi_{CP}(t) + \pi_{delivery} \quad (16)$$

Natural gas for heating is not priced in real time like electricity, as it is much easier to store. The thermostat queries the natural gas provider's Web service from time to time for the current price of natural gas.

Weather and Sun

The predicted outside temperatures and cloud cover may be obtained from any weather service that publishes such predictions for the location at which the house stands. For the United States, the thermostat may obtain them from the forecast Web site of the National Weather Service.

The predicted elevation of the sun may be computed locally or downloaded from the Internet as well, for example from the Web service provided by the Astronomical Applications Department of the US Naval Observatory.

Both obtaining a weather forecast and obtaining future sun elevations require knowledge of the location where the house stands. This may be entered by the thermostat's installer when the thermostat is being installed. To make the task easier and reduce the risk of a wrongly entered location, the thermostat may obtain its location from an online IP location service that maps the network address from which the request is sent to a location and alert the user if this does not match the address entered manually.

Appliance Energy Use

The electrical power consumed by appliances that are not controlled by the thermostat, but that contribute to heating the house, is estimated using historical averages. The thermostat observes the power consumed during each fifteen-minute interval of the day. To obtain the power consumed by appliances, the thermostat takes each minute the total power consumed and measured by the power meter 108, subtracts from it the power use of HVAC devices the thermostat had switched on, and sums this appliance power up for fifteen-minute intervals. The thermostat then computes a predicted appliance power use for a fifteen-minute time interval in the future as an exponential moving average of the appliance power use during the same time of day during previous days.

The thermostat refines the prediction explained in the previous paragraph by using the same autoregressive model described above for refining the utility company's predicted energy prices from five-minute energy prices, i.e., the thermostat uses an autoregressive model whereby the difference between the current appliance power consumption and the historical average power consumption for the same time of day decays exponentially.

It is also possible for the thermostat to work without a reading of electrical power consumed, and thus without the cost of the networked power meter 108. In this case the Kálmán filter described below will infer heating from appliance use as heating that cannot be explained by outside temperatures, sunshine, or furnace operation, and make it a part of $f_{Residual}$.

With a given proposed control strategy $s(t)$, the total predicted energy use contributing to warming the house is then the sum of the predicted energy use from appliances unrelated to the heating and cooling system plus the power use caused by the proposed control strategy, not including the power use of the air conditioning compressor since it heats the air outside, not inside the house.

Constants and Kálmán Filter

The thermostat also need values for the constants in the thermal and cost models described above. These constants are set to initial values by the installer. For the thermal model constants describing the building, $a_{radiation}$ and $a_{con}$, the thermostat may ask the installer for the size and building type of the house and use a lookup table for suitable initial values. For the heating and cooling effect of the furnace and air conditioner, the installer may enter the thermal power of these devices specified by the manufacturer in BTU per hour and the thermostat divides these figures by the house's size and multiplies by a constant to get an initial estimate of the heating and cooling effect of these devices. For the heat transfer effect of the outside air duct/fan 128, the installer may enter the capacity of the fan in cubic feet of air per minute, and the thermostat divides this value by the house's size and multiplies by a constant to get an estimate of $a_{OutFan}$. Similarly, the installer may enter the electricity and gas consumption of each of the heating/cooling aggregates. Instead of having the installer enter the thermal power and power consumption of the various devices as numbers, the thermostat may also offer to look them up from an online database by make and model of the device or simply use default numbers.

As the thermostat operates, it updates the model constants by use of Kálmán filters, an algorithm well known in the art, that implement the thermal and power models given above. In this way, the thermostat will arrive at much more precise numbers than the estimates derived from house type and size, and it will also automatically update to long-term changes, for example as equipment ages or as growing trees increasingly shield the house from being heated by the sun. It is also possible to skip the initialization step in the previous paragraph and simply initialize the constants to values that seem appropriate for the thermostat's intended installation location, for example, a single-family home, a rental condo, or other such broad categories. In this case, the uncertainty parameters of the Kálmán filter will be initially set to indicate very great uncertainty about the parameters' values, and the thermostat will learn the appropriate values over the course of some days from observing its own operation through the Kálmán filter.

The thermostat may monitor the constants as they are updated by the Kálmán filter and alert the user if they have changed to a value that appears problematic. For example, if the air conditioner's power consumption has gone up substantially or if the air conditioner's cooling capacity has gone down substantially since the thermostat was installed, it may alert the user that the air conditioner may require servicing or replacement. Similarly, if $a_{con}$ increases substantially over a longer time period, the thermostat may alert the user that there may be an air leak in the house.

Instead of a Kálmán filter, the thermostat may also use another state estimation filter of which many are known in the art such as the extended Kálmán filter, unscented Kálmán filter, or particle filter. Another possibility is simply to use multivariate linear regression for a given time window that may be thirty days.

Fallback Modes

The thermostat depends on a number of external data sources. Thermostats typically remain installed for a long time, and so it is important that the thermostat fail gracefully if some or all of the data sources become unavailable. External data sources may fail temporarily due to technical problems, or they may become unavailable as a service provider no longer offers the data service in question.

The thermostat may regularly check a Web service of its manufacturer for software updates that may substitute new data sources for ones that are going out of service.

For the data sources that are somewhat predictable, the thermostat may use an internal database to reduce reliance on the external data. For example, the thermostat may load sun elevation data for many years in advance, and if sun elevation data for a given day is not available, the thermostat may simply use the very similar elevation data for the same day in a previous year. Similarly, the thermostat may upon installation load long-term weather averages into its non-volatile memory. If a weather prediction for a given time is not available, the thermostat may use the long-term average for the time of day and day of year in question as a fallback.

If real-time power pricing information is no longer available, the energy pricing model described above will allow the thermostat to make reasonable decisions for a few days. If after a few days the energy price data feed has not been restored, the thermostat may fall back to a mode that simply assumes a constant energy price or a price pattern typical for the season. This, of course, disables the thermostat's capability to take advantage of variations in energy prices, but it does keep the house warm.

In managing the various data needed, it is important that daylight savings time not cause any difficulties. This may be accomplished by using UTC instead of local time for internal calculations.

Optimizer—FIG. 5

The core part of the embodiment is the optimization algorithm that the thermostat uses to find an optimal control strategy when to switch on and off the furnace, air conditioner, and outside air fan. It is important to note that switching these loads on and off right now is all the thermostat can really do. It uses a much more sophisticated planning internally, but the only part of this planning that actually influences anything is whether the thermostat decides to switch these aggregates on or off right now. The control flow of the optimizer is also shown graphically in Nassi-Shneiderman notation in FIG. 5.

In order to find an optimal control strategy, the thermostat looks 36 hours into the future and divides these 36 hours into 432 five-minute intervals. For each of these five-minute intervals, the thermostat attempts to find a control state s(t), which comprises whether the HVAC system 110 is set to Off, Cool, or Heat and whether the fan 128 is Off or On. The optimal control strategy is one where the cost over the entire time for which the plan is made $\Sigma p(t)$, comprising energy cost and the penalty for the temperature not being where it should be, is minimized.

This problem is known in the art as an integer optimization problem, and integer optimization problems are known to be hard, and in particular to be NP-hard. The only known way to solve this problem in the general case is to try out all possible combinations, of which with six possible control states and 432 time intervals there would be $6^{432}$, a number that is large beyond comprehension. Thus, we need a way to solve the problem in a way that gives us an almost optimal solution with a manageable amount of computation work. We achieve this by employing a random search algorithm that will give us a good global solution to our problem despite the presence of numerous local minima. Merely looking for a local solution, such as by calculating a gradient and moving in the direction of the steepest descent or other greedy methods will not work satisfactorily since the solution space typically has many local minima; the solution found by a thermostat that cannot look into the future will be one example of a suboptimal solution found by a particular greedy algorithm.

The first time the optimizer is run, in step 500 it initializes the best known solution to the strategy of simply keeping all heating and cooling aggregates in the Off state. The optimizer then evaluates the thermal model to predict the evolution of the temperature inside the house under this control strategy and then evaluates the cost model to find the cost, comprising energy cost and convenience penalty, for this control strategy. Before each optimization round, the optimizer loads the current thermostat state in step 502, the weather prediction in step 504, and the predicted electricity prices in step 506. In practice it is advantageous to perform the network operations corresponding to these steps, as well as to step 530, in a separate thread of control so that the optimizer can load all the information it needs from memory. The optimizer initializes the candidate solution to the best known solution in step 508 and calculates its cost, comprising both energy cost and convenience cost, in step 510.

After entering the loops 512 and 514, in step 516 the optimizer then randomly picks ten of the 432 time intervals. For each of the time intervals so picked, the optimizer randomly picks one of the devices controlled by the thermostat, either the HVAC system 110 or the fan 128. For each of the times and devices so picked, the optimizer sets the state to a new value randomly chosen among the values permissible for the device picked. For example, the optimizer might pick the 154th time interval, pick the HVAC system, and pick Cool as the new state. The optimizer in step 518 then evaluates the thermal model and the cost model for this new, randomly modified control strategy. If the cost is lower than the cost for the best known solution, the best known solution gets replaced with the new solution in step 522 and the cost of the best solution with the cost of the new solution in step 524; if not, the new solution gets discarded in step 526. The optimizer then repeats this until it does not find a better solution for 100,000 consecutive attempts by the exit condition of step 514.

Governed by the loop 512, the optimizer then repeats the steps described in the paragraph above, but instead of changing ten values at a time, it changes only five values at a time. When this has not given a better solution for 100,000 consecutive attempts, the optimizer changes only three values at a time until that does not give a better solution for 100,000 consecutive attempts.

The optimizer finishes with a greedy search in step 528 by trying out all possible state values for each state variable one at a time and seeing whether this improves the best known solution. The thermostat has now found an (almost) optimal control strategy and it sets the HVAC system 110 and the fan 128 to the states for the first time interval in the optimal control strategy. This greedy step is optional and hardly ever will change the solution, but it is computationally cheap and gives us comfort that if the random optimizer should by chance have done something odd it will be corrected.

In evaluating the cost function for a control strategy, the appropriate switching penalty $p_{switch}$ gets added to the total cost whenever an aggregate is in a different state in a time interval of the control strategy than it was in the preceding time interval of the control strategy or when it is in a different state in the first time interval of the control strategy than the state in which the aggregate is actually switched right now.

Once the optimal control strategy is found, the HVAC system and outside air fan are set to the operating state found optimal for the first time interval in step 530.

When the first time interval has elapsed after step 532, in step 534 the solver deletes the first time interval from the previous best known control strategy, and adds an additional element at the end with all aggregates set to Off. It then uses this as the initialization value to run the same random search algorithm again, and when it is finished sets the heating and cooling aggregates to the appropriate states.

As described here, the thermostat executes the solver algorithm once per five-minute time interval and then leaves the heating and cooling aggregates in the state it has found for ten minutes before it finds and executes the solution for the next time interval. Alternatively, it is possible to let the solver run continuously whenever there are spare computational cycles available on the thermostat's microcontroller.

The optimizer may show its planned strategy for switching the various aggregates on and off and the predicted evolution of the house's inside temperature on its display or through its Web interface. This allows the user to see how savings are achieved and to experiment with differently aggressive energy savings settings to find the tradeoff between cost and comfort he likes best.

Conclusion

The reader will see that the process of data acquisition and finding an optimal control strategy using a thermal model of the house and a cost function will control the heating and cooling aggregates in such a way as to maximize the occupants' comfort and minimize the energy cost incurred. In observing the system in practice, some patterns of optimal control strategies emerge, although these can, of course, vary depending upon local temperature patterns, power price patterns, and occupant schedules.

Oftentimes with traditional thermostats equipped with a scheduling function, users will allow a wider temperature window during the night than during daytime. In the case of air conditioning, they will set a higher thermostat setpoint for the night than for the day. It turns out that in the case of real-time electricity pricing, this is often exactly the wrong strategy. The energy-cost optimizing thermostat will instead use the very cheap electricity available during the night to precool the building in the early morning hours. If the building is reasonably well heat-insulated, this may be enough that no air conditioning at all is required during the day hours when energy prices during hot summer days often skyrocket to ten times or more the prices paid at night. If air conditioning is required during the day, the thermostat will at least avoid the most expensive peak hours. On a narrower timescale, the thermostat also responds instantaneously to short-term price peaks and drops. Finally, in the configuration of the present embodiment with not only the HVAC system 110 but also the fan 128, the thermostat will automatically use the fan instead of the air conditioning when during the night temperatures fall enough that the building can be cooled simply by exchanging the air inside for outside air without the need to run the expensive air conditioner.

The air conditioner will also anticipate heat peaks when during the hottest hours of the afternoon the heat brought into the building by the sun and the outside heat is too strong for the air conditioner to remove. In this case it is inevitable that temperatures will rise during peak hours, but the thermostat plans ahead and precools the building in advance.

Similarly to precooling in order to optimize energy cost for the air conditioner, the optimizer will also attempt preheating to take advantage of time-varying power prices. This is less relevant than for cooling even if the furnace is electric, not gas, since power prices tend to fluctuate less during heating than during cooling season, but even the power consumption of a central HVAC system's fan is not negligible and savings can be achieved by taking varying power prices into account when planning its operation. The polar vortex in early 2014 is an example of serious price excursions in electricity markets due to extreme cold and consequent need for heating where the present embodiment would have reduced electricity cost significantly for certain installations.

As a flipside to precooling and preheating, the optimizer will also tend to end heating and cooling earlier in advance of the desired temperature window widening, for example because the user will be away. This is because heating or cooling when the temperature window will remain the same generates a benefit that last for quite some time; if it is too hot now and we cool, it will stay cooler than it would otherwise have been for some time. But if the user is leaving or going to bed soon, he will only enjoy a short time of benefit from the heating or cooling and no benefit from the temperature being warmer or narrower in the following time intervals. Thus the optimizer will be more inclined to tolerate some temperature deviations ahead of a widening temperature window.

The thermostat also makes it unnecessary to switch it from heating into cooling mode as is the case with many traditional thermostats. Traditional thermostats often require this to be switched manually so as to avoid using heating first and then, as the day gets warmer, having to use cooling to remove the heat generated earlier. The thermostat of the present embodiment will automatically take into account the predicted temperatures and avoid operating heating or cooling when this would make it necessary to perform the reverse operation later on. With its control of the outside air duct 128, in such a scenario of outside temperatures swinging below and above the desired temperature, the thermostat will often be able to achieve the desired temperature simply and cheaply by letting outside air in at times when it is of the appropriate temperature and then closing the duct as it gets too hot or too cold outside, resulting in user comfort and a great energy savings.

When one observes this optimizer in action in moderate climates an interesting pattern emerges. If the house is not equipped with the outside fan 128, one notices that oftentimes the air conditioner will run when the outside temperature is colder than the inside temperature anyhow. This makes sense, because electricity is the most expensive when many air conditioners are running because it already got hot, so removing heat in advance of a hot day gives both more comfortable temperatures and lower energy cost. But if this is so, then in moderate climates not much air conditioner run time is required in the first place and most of cooling can be accomplished by letting cool outside air in when the optimizer expects a hot day. At that point, in some installations one might find that an air conditioner is not required at all since it would only be needed on a few days and users are willing to take higher temperatures on those days in return for saving the cost of buying and owning the air conditioner. Thus, in moderate climates the optimizer can also operate just controlling a heater and an outside air fan; this works much better than a traditional whole-house fan because the optimizer can operate the fan predictively, and it can save on electricity cost by running that fan when electricity is cheap.

Additional Embodiments

The method for controlling one or more loads that have discrete power states such as On and Off disclosed in our discussion of the first embodiment is quite adaptable to extension and modification. In particular, the use of a random search algorithm to solve the problem of controlling these loads as an integer optimization problem means that we are not constrained to models that have a particular functional form, such as linear models. In the following section, we will discuss some additional embodiments.
Multizone Thermostat with Shared HVAC—FIG. 3

Our discussion above assumed a single-family home supplied by a central HVAC system where we took the temperature measured at the thermostat to be representative of the temperature within the entire house. For larger objects, it can be beneficial to define more than one zone that can be heated and cooled separately.

Figure 3:
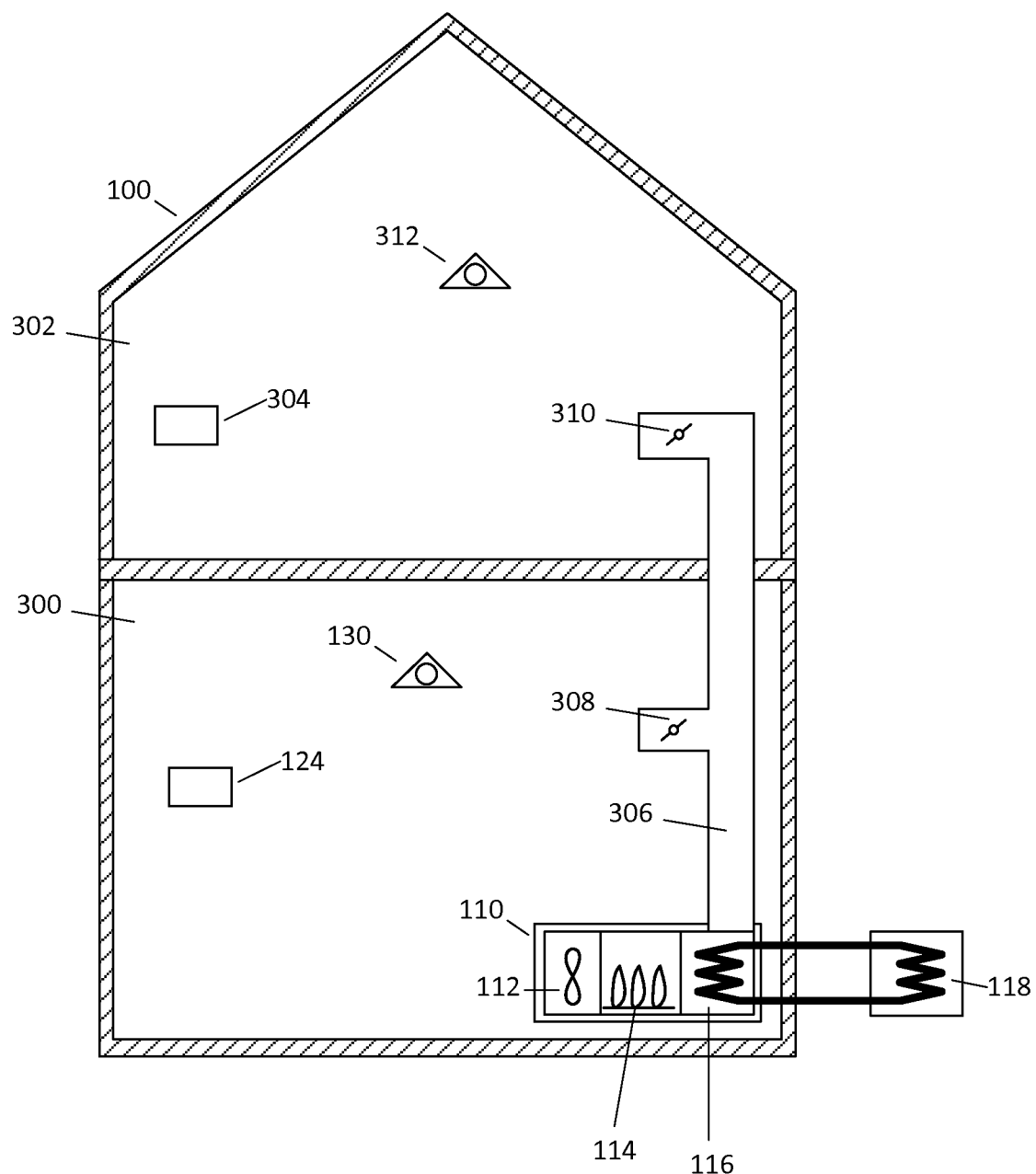
FIG. 3 shows one embodiment of the energy cost optimizer where the optimizer is a thermostat installed in a house with two separate temperature zones.

FIG. 3 shows an installation similar to the one of the first embodiment shown in FIGS. 1 and 2, but configured to treat two floors of the house as separate thermal zones. This may be either because the house is divided into two different units with different occupants or simply to control different temperature zones in a single-family home. For example, the lower floor may contain the living room and kitchen, and the upper floor may contain bedrooms. In this case, the occupants may during the day care a lot about the temperature in the lower floor but be fairly indifferent to the temperature in the upper floor, whereas at night they care a lot about the temperature in the upper floor but are indifferent to the temperature in the lower floor. Power and network connections have been omitted from FIG. 3 and are analogous to the ones shown in FIG. 1.

The central HVAC system is connected to an air duct 306. The air fed into this air duct is controlled by a damper 308 (or a set of dampers) that controls air flow into the lower floor and another damper 310 that controls air flow into the upper floor. These dampers may be connected to the thermostat 124 by 24 V AC cables through which the thermostat can turn them open or closed. There is also a thermostat panel 304 installed in the upper floor which includes a temperature sensor and a display and user control elements to set the desired temperature. The panel 304 forwards its temperature reading and user input to the thermostat 124, which makes the decisions which aggregates to switch into which position for both floors. The outside air duct 128 has been omitted from FIG. 3, but may be included in this multizone installation as well.

The thermal model for the two-zone installation includes more terms than for the first embodiment, but does not change conceptually. Instead of one target temperature $\vartheta_{house}$ there are now two, $\varepsilon_{upper}$ and $\varepsilon_{lower}$. The equations for $f_{radiation}$ and $f_{con}$ get split up into separate values for the upper and lower floor so that we have, for example:

$$f_{radiationUpper} = \frac{\partial \vartheta_{upper}}{\partial t} = a_{radiationUpper}(1 - c_{cloud})\sin(\max(0, \alpha_{sun})) \quad (17)$$

There are also two new convection/conduction terms for the heat flow between the two floors:

$$f_{conUpward} = \frac{\partial \vartheta_{upper}}{\partial t} = a_{conUpward}(\vartheta_{lower} - \vartheta_{upper}) \quad (18)$$

and equivalently for downward heat flow. One may also choose to make these functions asymmetric with different constants for positive and negative temperature differences to take into account that hot air has a tendency to rise. As the number of zones in a model increases, it may be more convenient to model energy flows instead of temperature flows since the energy flow in both directions will be the same amount, but with opposite signs; in this case, the Kálmán filter will have to estimate heat capacities of each zone so as to convert energy flows into temperature changes.

For the model of the HVAC's heating or cooling effects we now have a larger number of control states than previously since for Cool or Heat either only the upper damper 310 or only the lower damper 308 or both dampers may be open; when the HVAC is in Off state, both dampers are closed. This gives us the seven control states

| HVAC | Lower damper | Upper damper | Lower constant | Upper constant |
|---|---|---|---|---|
| Off | Closed | Closed | 0 | 0 |
| Cool | Open | Closed | $a_{CoolOpenClosedLower}$ | 0 |
| Cool | Closed | Open | 0 | $a_{CoolClosedOpenUpper}$ |
| Cool | Open | Open | $a_{CoolOpenOpenLower}$ | $a_{CoolOpenOpenUpper}$ |
| Heat | Open | Closed | $a_{HeatOpenClosedLower}$ | 0 |
| Heat | Closed | Open | 0 | $a_{HeatClosedOpenUpper}$ |
| Heat | Open | Open | $a_{HeatOpenOpenLower}$ | $a_{HeatOpenOpenUpper}$ | and for each of these states we have two constants that describe the state's impact on the temperature in the upper and the lower floor, but since many of these constants are known to be zero, we are left with eight constants instead of the two from the first embodiment that the Kálmán filter has to estimate.

There are also two separate penalty functions for the upper and lower temperatures, which can be modified by changing setpoints, schedules, or economy/comfort preferences at the thermostat 124 or the control panel 304.

The thermostat 124 loads the same predicted values and runs the same random search optimization algorithm as in the first embodiment with the thermal and cost model changed for the two-zone case as described. This gives an optimal control strategy to control the HVAC system and the dampers maximizing occupant comfort and minimizing cost with the tradeoff between these two goals specified by the two penalty functions for the upper and lower floors.

The thermostat may keep a record of the control states and use them to split costs between the upper and lower floors if they are occupied by different residents who pay for heating and cooling separately. Whenever only one damper is open and the other is closed, the entire energy cost for that time interval gets allocated to the unit with the open damper. When both dampers are open, the energy costs gets split between the two units in proportion to the air flow received by each unit when both dampers are open. This system does not represent the energy use by both units entirely accurately since the energy provided to the two units depends on the difference between the temperature of the air inside each unit and the temperature of the air coming out of the air duct, but it is often close enough and does not depend upon additional sensors.

The two-unit embodiment presented here allows two units of a house managed as separate temperature zones to share a common HVAC system and to have an optimal control strategy how to share that HVAC system in a way that minimizes overall cost given the temperature preferences and schedules specified for each temperature zone. For example, if the lower floor is unoccupied during the night, this may allow the thermostat in the winter to let the temperature in the lower floor fall during the night while keeping only the upper floor warm. During cooling season, the thermostat may precool an unoccupied floor to a temperature that would be uncomfortably cold in order to take advantage of cheap electricity so that the floor will be at a comfortable temperature at a later time when electricity is expected to be expensive. In the case of the two floors being separate units, the embodiment allows them to share an efficient central HVAC system instead of relying on less efficient separate units.

An alternative implementation may use separate HVAC units for both temperature zones, but still model heat transfer between the two. Yet other configurations possible would include a shared air conditioning unit but separate electric heaters in different zones. The reader skilled in the art will see that the thermal model may be modified to accommodate all these cases and the optimizer will find a optimal solution for cost-effective operation.

Multiple Energy Sources

In the first embodiment, the gas furnace shown may be augmented by an electrical heater that may have the states On and Off. Thus, when heating is required the thermostat now has a choice between two sources of heat and will pick the cheaper one. This will ordinarily be natural gas, but the thermostat will automatically switch over to electric when real-time electricity prices become lower than gas prices or even, as happens from time to time, negative. In the latter case, the residents effectively get paid for keeping the home cozily warm and stabilizing the power grid at the same time.

Operating off multiple energy sources is particularly attractive in heat pump installations with fossil fuel auxiliary heaters. In this case, the optimizer may pick the cheapest heat source depending on temperatures and energy prices; depending on which one is cheaper the optimizer will heat either with electricity or with gas. This is analogous the the optimizer picking between outside air and an air conditioner as sources of cooling in the first embodiment. Another possibility is selecting between running a heat pump for heating or running resistive electric heating. The optimizer in this case will find the optimal tradeoff between running the more efficient unit for a longer time or running the more effective but less efficient unit for a shorter time, or running both together.

Figure 4:
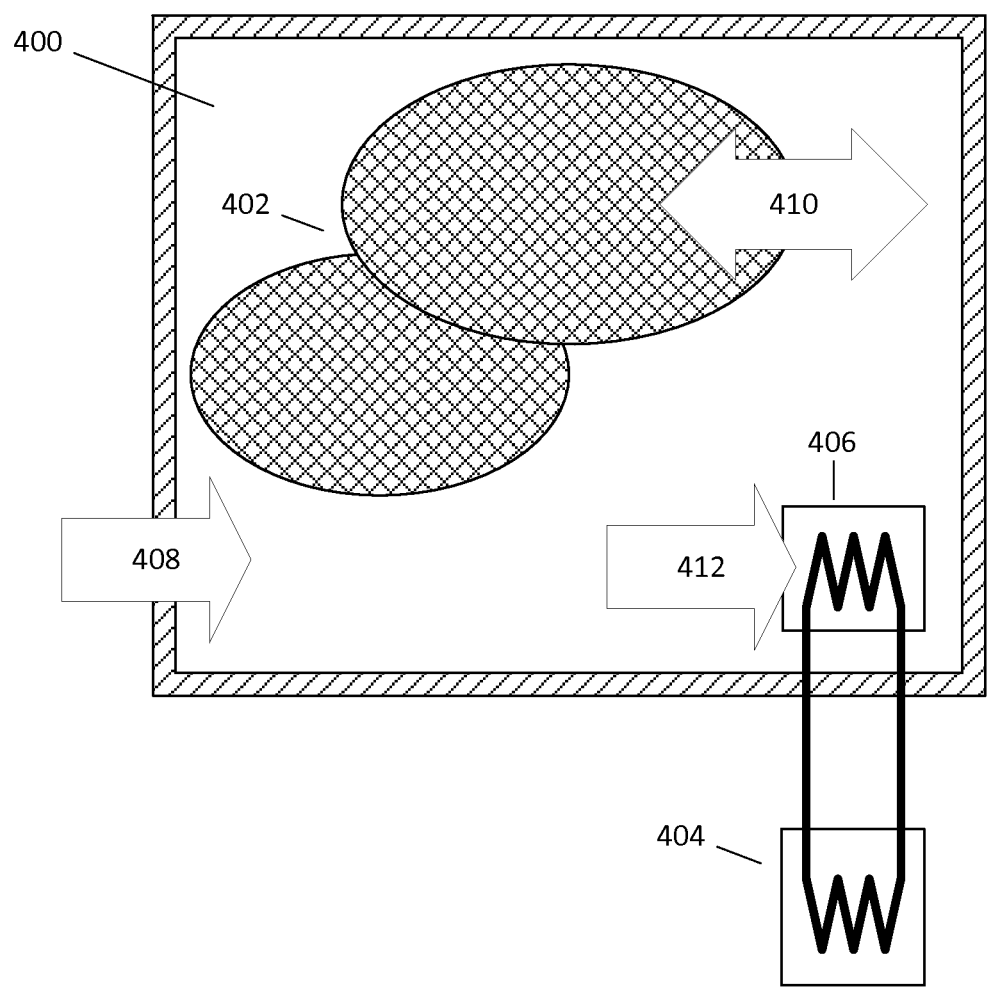
FIG. 4 shows one embodiment of the energy cost optimizer where the optimizer controls a refrigerator.

Refrigerator and Cold Storage—FIG. 4

In yet another embodiment, the power consumer controlled and optimized in its power consumption patterns is a refrigerator, which may range in size from a small household refrigerator to a large cold storage facility. The thermal model will change somewhat from the applications for controlling the temperature in living spaces, but the principle of operation remains the same.

The thermal model of this embodiment is shown in FIG. 4. A refrigerator 400 contains goods 402 stored in it, which get refrigerated by a heat machine comprising a condenser 406 and a compressor 404. The environment outside the refrigerator is considerably warmer than the air inside, and even though the refrigerator is heat-insulated, this results in a heat flow 408, which we may model by $$f_{outside} = \frac{\partial \vartheta_{air}}{\partial t} = a_{outside}(\vartheta_{outside} - \vartheta_{air}) \tag{19}$$

where $\vartheta_{air}$ is the temperature of the air inside the refrigerator, $a_{outside}$ is a constant describing the refrigerator's heat insulation, and $\vartheta_{outside}$ is the temperature of the air outside the refrigerator. There are several possibilities for obtaining predictions of $\vartheta_{outside}$. In many cases, one can simply assume it to be constant. For example, for a household freezer meant for installation in a kitchen one may simply assume the outside temperature to be an ordinary room temperature. One may also use a long-term exponential moving average of the outside temperature as the predicted value for the future to take into account that the refrigerator may, for example, be installed in a basement. A more sophisticated possibility is that a thermostat as described in the first embodiment makes the predicted air temperature inside the house available through the computer network and the refrigerator reads this predicted temperature and uses it for its own energy price optimization. For a freestanding refrigeration facility, one may use the same thermal model of sunshine and heat conduction from the outside as described for the house in the first embodiment. The model may also include a term $a_{door}$ using the same equation but applying when the refrigerator's door is open and air gets freely exchanged between inside and outside.

The refrigerator contains goods of an unknown temperature and heat capacity; both of these may change whenever the door gets opened and goods are removed from or inserted into the refrigerator. We may write this temperature exchange 410 as $$f_{goods} = \frac{\partial \vartheta_{air}}{\partial t} = a_{goods} C_{goods} (\vartheta_{goods} - \vartheta_{air}) \tag{20}$$

where $\vartheta_{goods}$ and $C_{goods}$ stand for the temperature and heat capacity of the goods inside the refrigerator. The Kálmán filter will set the uncertainty about both of these to a large value whenever the door gets opened. As the door gets closed, the filter will infer from the speed of the temperature change inside the refrigerator and the speed with which this speed changes appropriate values for the temperature and heat capacity of the goods inserted and removed. In a household refrigerator, there may be a prediction based from historical observations that the door will be opened and goods inserted or removed during specific times of day. In a commercial cool storage, there may be a plan available from an inventory management system that the controller can use to predict the temperature and amount of goods removed or inserted into the storage at different times.

The heat flow 412 from the inside air to the condenser whenever the compressor is switched on is modeled in the same way as in the first embodiment.

The penalty function may be chosen as in the first embodiment for a refrigerator, but for a freezer the penalty function will be asymmetric with a large penalty for the temperature exceeding a certain maximum value but a fairly high tolerance for the temperature falling below its ideal value. The optimizer works the same way as in the first embodiment. Especially in the freezer application, the optimizer will tend to precool the refrigerated goods during periods of low power prices so that it does not need to run the compressor during periods of high prices.

In refrigeration applications, too, it can be advantageous to include a computer-controllable inlet for outside air comparable to the fan 128 of the first embodiment. In this way, the optimizer may find opportunities during winter to remove excess heat from operation of electric loads and so on simply by letting outside air in instead of having to run refrigeration hardware.

Charging a Hybrid or Electric Vehicle

The optimizer may also be implemented as a controller for charging an electric or hybrid vehicle from the power grid. The model in this case will be that the battery has a certain load level, which can be increased by buying power from the grid and charging the battery. It may also be possible to sell back power to the grid from the battery. Since there is a loss involved in both charging the battery from mains power and generating mains power from the battery, the amount of power needed to charge the battery by one unit will be more than the amount of power that can be recovered by depleting the battery by one unit. The cost function can be that there is a large cost if the battery is not fully charged at a given time when the user plans to drive somewhere. There may also be a smaller cost for the battery not being charged to a certain level at any time to reflect the convenience of having the vehicle ready to go at any time. In a hybrid car, the cost function may consider the fill level of the tank and the current price of gasoline and accept a risk of not being able to charge the car at an acceptably low cost if the tank is sufficiently full and it is more economical just to use gasoline instead of of charging the battery during peak prices. The optimizer may obtain the current price of gasoline from the Internet.

The random search optimizer described in the first embodiment then finds the optimal times to charge the car given the predicted power cost and the penalty function. It will attempt to charge the car during the time of the cheapest power prices and also regulate around short-term price spikes. If it can also sell power back to the grid it will do so during price spikes.

If the car is a hybrid and parked in a place with appropriate ventilation, it is even possible for the optimizer to control the engine of the car and cause power to be generated that can be sold to the grid during extreme price spikes. Hybrid cars are not the most efficient power plants, so this will only be economical, and thus the optimizer will only do it, during truly extreme price spikes, but during these spikes running a hybrid car as a power plant may both make a handsome profit for the car's owner and save the power grid from brownouts. If this function is desired, the cost function for running the car's engine should take into account not only the price of fuel, but also wear and tear, lubricant use, loss of resale value from engine operating hours, and so on.

Local Power Generation

The idea of having the optimizer decide on an optimal strategy for selling power back to the grid may also be extended to other forms of local power generation. For example, the house of the first embodiment may be equipped with photovoltaic cells that generate power when the sun shines on them. If the price for which one can purchase power and the price for which one can sell power to the grid during a given time interval were identical, there would be no point in taking local power generation into account in running the thermostat of the first embodiment. The power price would be whatever it is, and the fact that during some times the house is selling power back to the grid would not influence the decision when and how to run the HVAC system in a cost-optimal way. In practice, however, the price at which power can be bought is not identical to the price at which it can be sold at the same time, and in this case cost can be optimized by including local power generation capacity in the energy cost optimizer, for example in the thermostat described in the first embodiment.

In a market-based power grid, the price at which power can be bought will be higher than the price at which it can be sold to account for transmission losses, the cost of operating the power transmission grid, and so on. In this case, the optimizer can achieve a better result if it can take into account a prediction how much power will be generated locally. To make this prediction, the thermostat knows the azimuth and elevation at which the solar cells point into the sky. It then uses the cloud cover prediction and the position of the sun to predict the amount of power generated at different times in the future. If the price of power stays relatively constant over time, the optimal strategy found by the optimizer will often be to concentrate power use during times when power is being generated locally since avoiding using power from the grid adds more value than is foregone by not selling the same amount of power to the grid. During times of high variations in power use, the optimizer may find that the optimal strategy still is to use power from the grid to precool the building during periods of low prices and to sell back locally generated power to the grid during periods of high energy prices.

In actual energy markets, prices are often not solely or even primarily determined by supply and demand, but by political and regulatory decisions. For example, the German Renewable Energy Act guarantees some small producers of renewable energy prices for power they feed into the grid that may be higher than the prices they pay for power from the grid. In this case, the optimizer will tend to schedule power use so as not to coincide with periods of expected local power generation so that power used can be bought cheaply from the grid and power locally generated can be sold dearly to the grid. This result maximizes the benefit of the thermostat's owner. It is, of course, of dubious value for the economy at large, but it is an accurate response to the incentives set by policymakers and does maximize the amount of renewable power fed into the public grid, which is the apparent goal of this pricing policy.

As a special case of local power generation, another embodiment uses the optimizer to control certain auxiliary systems in power plants. A power plant has a gross generation and a net generation that is the gross generation minus the often considerable power needs of the plant itself, e.g., for cooling systems. By running an optimizer analogous to the first embodiment for the cooling system, with the coolant's temperature instead of the temperature in a house being the target variable, it is possible to increase net generation during periods of peak prices, increasing the plant's profitability. The same optimization algorithm may also ramp generation itself up or down. This application will often have continuously variable loads involved as explained in the section on mixed-integer programming below.

Server Support

The thermostat of the first embodiment uses day-ahead hourly prices and realized locational marginal prices to calculate a forecast of expected settlement prices. Another approach is to offload this prediction task to an outside service provider that can make use of more information. The thermostat's manufacturer may offer predicted power prices as a Web service accessed by the thermostat. The server run by the thermostat's manufacturer may use a large set of data sources, including day-ahead prices and LMPs from the RTO, spot and forward pricing data from wholesale markets, weather forecasts not only for the location of the thermostat but nationwide, and even manual human expertise, and integrate these into a better forecast of energy prices. This forecast can then be used by the thermostat instead of the simpler model given in the first embodiment. Even though in this case support from an outside server is used, there is no privacy issue since information is only read from that server, but no energy use patterns or other private information need to be transmitted to the server.

If the thermostat is severely constrained in its computation capacity, for example because it is an old thermostat not originally built to work as an energy cost optimizer that has been updated with new software, it is also possible to outsource running the optimizer to a central server. In this case, private customer data has to be transmitted to the server, but this scenario is still very different from the central optimization strategies discussed in the prior art. These strategies attempt to solve a gargantuan global optimization problem for all customer sites together, which is an exceedingly hard problem. In some of the present embodiments, if a central server is chosen to do the optimization, the optimization is performed separately for each customer site so instead of one unmanageable problem we have many manageable ones that can be easily distributed across several inexpensive industry-standard servers. The global coordination that prior art has attempted to solve as a central planning problem is solved solely by the most effective of all coordination mechanisms: price signals. If the thermostat is configured to run the optimization problem on a remote server, it may have a simpler optimization algorithm, for example one that does not look as far into the future, as a local fallback mechanism in case communication with the remote server fails.

Mixed Integer Programming

The embodiments given so far have all been pure integer programming cases. All devices controlled by the energy cost optimizer had discrete states such as Off, On, Heat, or Cool, and settings between these states were not permitted. There may also be applications where some devices controlled by the optimizer have discrete states, but other devices can be controlled continuously. (It may be that technically these are discrete states, for example 1% steps, but for all practical purposes this can be treated as a continuous variable.) For example, an installation may be equipped with a gas furnace that can only be On or Off as well as with an electric heater that can be controlled to be in any state between 0% on and 100% on. Thus some of the variables to be controlled are discrete or integer and some are continuous, and the problem turns into one of mixed integer programming.

The random search optimizer can deal with this class of optimization problems as well. One way to tackle the problem is to include both the continuous and the discrete variables in the random search as described in the first embodiment. Let us assume that the continuous variables take values between 0 and 1 for totally switched off and full load. During each optimization step when a discrete variable is chosen for a random modification, it will still be modified as described in the first embodiment by setting it to a value chosen at random from the set of permitted discrete values for that variable. When a continuous variable is chosen for random modification, a random number chosen from a Gaussian distribution with a standard deviation that may be 0.1 is added to the variable; if the variable then is below 0 it will be set to 0, and if it is above 1 it will be set to 1.

Cost Reporting and Contracting

It has historically been difficult to convince owners of buildings to invest into energy improvements of these buildings. They often shy away from the cash outlay and may not believe a manufacturer's claims about energy improvements and cost savings. One advantage of the energy cost optimizer is that its internal model makes it easy to obtain a rather precise estimate of the money saved by using the energy cost optimizer as opposed to a suboptimal control strategy. For example, in the case of the thermostat of the first embodiment, one can simply run the thermal model used by the thermostat and continuously refined by its Kálmán filter on a simulation of a conventional thermostat with hot and cold setpoints. By simulating the times when a conventional thermostat would have switched the various devices on and off, one can then calculate the power cost that would have been incurred had a conventional thermostat been used. This information may be used in a pricing scheme where the realized cost savings is reported by the thermostat through the Internet to a contractor's server. This in turn enables a pricing model where the contractor installs the thermostat at the customer site without an upfront payment and instead gets paid a certain amount for the energy cost saved over a conventional thermostat.

Multi-Objective Optimization

The optimizer as shown in the first embodiment combines the financial cost of energy consumption and a penalty function for discomfort from temperature preferences not being met into a single combined cost function, and the optimization objective is to minimize that cost function. This is a logical approach to take from an economist's point of view, but some users may find the decisions the thermostat makes surprising. As an alternative it also possible to use a multi-objective optimization that stays closer to the model of traditional thermostat setpoints. For example, the optimizer may initialize the best known strategy with the strategy that would be pursued by a traditional setpoint thermostat. The optimizer can then try out different solutions as described in the first embodiment and accept a new solution as better if it is Pareto-dominant over the previously known best solution in that it does not increase temperature setpoint violations and does not increase energy cost, but offers either better savings or lower cost. In this case, the thermostat may be willing to accept high energy costs if needed to avoid setpoint violations, but will still attempt to reduce both cost and setpoint violations by appropriate precooling and preheating and by timing cooling and heating around energy price spikes if possible.

CONCLUSION, RAMIFICATIONS, AND SCOPE

Accordingly, the reader will see that the energy cost optimizer of the various embodiments can be used to control energy-consuming machines in an optimal way to minimize cost and maximize utility derived from the operation of these machines. The energy cost optimizer makes it possible to execute advanced trading strategies that previously were available only to sophisticated participants of the wholesale energy market on a device as humble as a thermostat, and to use hitherto unexploited energy storage capacity, such as the thermal capacity of a house, to exploit arbitrage opportunities, for which the owner of that house will receive a reward in the form of substantially reduced energy cost.

The energy cost optimizer is likely most useful in a fine-grained real-time pricing scheme where it can instantaneously react to changes in the energy price. Its applications are, however, not limited to true real-time pricing. Much utility and cost savings can still be realized in a regime of, for example, the hourly averaged real-time prices explained in the first embodiment. The optimizer also can realize cost savings in time-of-use pricing schemes where energy prices change with the time of day, but according to a fixed scheme independent of supply and demand. For example, the thermostat of the first embodiment in a time-of-use pricing scheme would still be able to precool the house when electricity rates are low to avoid energy use later when it is hot outside and electricity rates are high. Even in applications where the electricity rate is nominally fixed but in fact includes a time-varying element, such a CP charge, the energy cost optimizer is very useful to mitigate these charges.

The energy cost optimizer in fact even has some benefit in a scenario where energy prices do not vary at all, although in this case it will simply minimize energy use, not energy cost per unit of energy. For example, the thermostat of the first embodiment may be used in an installation where the energy price is fixed. In this case it cannot, of course, shift energy use from time periods of high prices to time periods of low prices, but its ability to look into the future still allows it to make wiser decisions than a simple set-point thermostat could. For example, the thermostat may notice that the house's temperature is getting a little higher than it should, but it may decide not to run the air conditioner because the weather prediction it downloaded predicts a cold front coming in soon that will drastically reduce temperatures so that the benefit of cooling now is small. If great heat or cold is expected, the thermostat will start precooling or preheating early on so as to achieve an acceptable temperature at the time needed, but it will not do so when it is unnecessary and would be wasteful during more favorable weather.

We have talked much about random search. It is to be understood that random search does not necessarily need truly random decisions, but most commonly is implemented using pseudorandom numbers generated by such algorithms as the Mersenne Twister or even quasi-random low-discrepancy sequences. 'Random search,' as we use the term in this application, is to be understood to include all optimization algorithms that use random, pseudorandom, or quasi-random numbers to decide which part of the solution space to explore next. Examples of random search algorithms are the one given in the description of the first embodiment, simulated annealing, genetic optimization, particle swarm optimization, ant optimization, and so on.

Although the description above contains many specificities, these should not be construed as limiting the scope of the embodiments but as merely providing illustrations of some of several embodiments. For example, data may be obtained from different sources than the ones suggested, and thermal and cost models may take a different functional form than the ones suggested.

The optimizer may also be applied to different classes of energy consumers than the ones discussed. In the real-time pricing schemes available right now where pricing time intervals are fairly long, for example one hour, the optimizer is mostly useful for applications that have a substantial energy storage capacity, such as heating and cooling or charging a battery. If, however, it is possible to buy energy for real-time price in very short intervals, for example of one second, even machines such as irons, electric stoves, or microwave ovens may use the energy cost optimizer to reduce energy cost and provide a great deal of stabilization to the power grid.

Thus the scope of the embodiments should be determined by the appended claims and their legal equivalents rather than by the examples given.

I claim:

1. A switching apparatus comprising an electronic processor and a switch for an energy consumer, said processor being adapted to
    read an input from values provided by an electronic sensor through an electronic input,
    define a function in an electronic memory mapping a proposed control strategy to a cost of said proposed control strategy, said cost comprising a merit or a demerit for attaining at least one predetermined goal as well as a price of energy where said price of said energy depends upon time and said price varies more frequently than once per twenty-four hour interval, to
    evaluate on an electronic processor a plurality of said proposed control strategies which are different against said function in a stochastic optimization method chosen to converge toward a global minimum or a global maximum even if said function optimized possesses numerous local minima or maxima, and to
    control through said switch actuated by said processor said energy consumer according to a selected control strategy found by said stochastic optimization method, said predetermined goal being characterized by some of said values read from said electronic sensor being preferable to other of said values according to a preference function stored in said electronic memory which maps said values read from said electronic sensor to a value indicating a smaller or a greater preference, said merit expressing said greater preference and said demerit expressing said smaller preference,
    said different proposed control strategies being strategies for controlling said energy consumer, and said energy consumer changing through its operation said input read from said electronic sensor.

2. The switching apparatus of claim 1 where said stochastic optimization method is configured to solve an integer or mixed-integer optimization problem in evaluating said different proposed control strategies.

3. The switching apparatus of claim 1 where said control strategy comprises discrete operating states of said energy consumer, said operating states being characterized by having different amounts of energy consumption per unit of time.

4. The switching apparatus of claim 1 where said energy consumer comprises at least a first controllable part and a second separately controllable part and said control strategy comprises discrete operating states for said first part of said energy consumer and substantively continuous operating states for said second part of said energy consumer, said operating states being characterized by having different amounts of energy consumption per unit of time.

5. The switching apparatus of claim 1 where said energy consumer is an HVAC system.

6. The switching apparatus of claim 5 where said HVAC system comprises a plurality of temperature zones.

7. The switching apparatus of claim 6 where said function estimating the cost of a strategy models heat transfer between temperature zones.

8. The switching apparatus of claim 5 where said energy consumer comprises an apparatus adapted to exchange air inside a structure with air outside said structure, and said function models heat transfer between said inside and said outside by operation of said apparatus adapted to exchange said air inside said structure with said air outside said structure.

9. The switching apparatus of claim 5 where said energy consumer is controlled by a wall-mounted thermostat.

10. The switching apparatus of claim 1 where said energy consumer is a battery.

11. The switching apparatus of claim 1 where said energy is electricity.

12. A machine-implemented method for optimizing the cost of energy consumed by an energy consumer comprising reading an input from values provided by a sensor through an electronic input, defining a function in an electronic memory mapping a proposed control strategy to a cost of said proposed control strategy for said energy consumer, said cost comprising a merit or a demerit for attaining at least one predetermined goal as well as a cost of energy where a price of said energy depends upon time and said price varies more than once per twenty-four hour interval, evaluating on an electronic processor a plurality of said proposed control strategies which are different against said function in a stochastic optimization method chosen to converge toward a global minimum or a global maximum even if said function optimized possesses numerous local minima or maxima, and controlling through an electric switching component actuated by said electronic processor said energy consumer according to a selected control strategy found by said stochastic optimization method, said predetermined goal being characterized by some of said values read from said sensor being preferable to other of said values according to a preference function stored in said electronic memory which maps said values read from said sensor to a value indicating a smaller or a greater preference, said merit expressing said greater preference and said demerit expressing said smaller preference, said different proposed control strategies being strategies for controlling said energy consumer, and said energy consumer changing through its operation said input read from said electronic sensor.

13. The method of claim 12 where said energy is electricity.

14. The method of claim 12 where said stochastic optimization method is configured to solve an integer or mixed-integer optimization problem in evaluating said different proposed control strategies.

15. The method of claim 12 where said control strategy comprises discrete operating states of said energy consumer, said operating states being characterized by having different amounts of energy consumption per unit of time.

16. The method of claim 12 where said energy consumer comprises at least a first controllable part and a second separately controllable part and said additional control strategy comprises a plurality of discrete operating states for said first part of said energy consumer and substantively continuous operating states for said second part of said energy consumer, said operating states being characterized by having different amounts of energy consumption per unit of time.

17. The method of claim 12 where said energy consumer is an HVAC system.

18. The method of claim 17 where said HVAC system comprises a plurality of temperature zones.

19. The method of claim 18 where said function estimating the cost of a strategy models heat transfer between said temperature zones.

20. The method of claim 17 where said energy consumer comprises an apparatus adapted to exchange air inside a structure with air outside said structure, and said function models heat transfer between said inside and said outside by operation of said apparatus adapted to exchange said air inside said structure with said air outside said structure.

21. The method of claim 17 where said energy consumer is controlled by a wall-mounted thermostat.

22. The method of claim 12 where said energy consumer is a battery.

* * * * *